United States Patent [19]
Takeuchi et al.

[11] Patent Number: 5,959,209
[45] Date of Patent: Sep. 28, 1999

[54] SENSOR UNIT HAVING MULTIPLE SENSORS EACH PROVIDING INDEPENDENT DETECTION OF A FORCE COMPONENT

[75] Inventors: Yukihisa Takeuchi, Nishikamo-gun; Masahiko Namerikawa, Inazawa; Kazuyoshi Shibata, Mizunami, all of Japan

[73] Assignee: NGK Insulators, Ltd., Japan

[21] Appl. No.: 09/046,813

[22] Filed: Mar. 24, 1998

[30]     Foreign Application Priority Data

Apr. 4, 1997   [JP]   Japan ................................. 9-086357

[51] Int. Cl.[6] .................................................. G01N 15/09
[52] U.S. Cl. ................................... 73/514.34; 73/862.043
[58] Field of Search ..................... 73/514.34, 862.041, 73/504.03, 862.043

[56]                  References Cited

U.S. PATENT DOCUMENTS

| 4,891,984 | 1/1990 | Fujii et al. . | |
| 5,065,628 | 11/1991 | Benecke . | |
| 5,100,498 | 3/1992 | Takeuchi et al. . | |
| 5,295,386 | 3/1994 | Okada ................... | 73/514.33 |
| 5,365,799 | 11/1994 | Okada ................... | 73/862.041 |
| 5,383,364 | 1/1995 | Takahashi et al. ........... | 73/514.34 |
| 5,496,352 | 3/1996 | Renger . | |
| 5,567,880 | 10/1996 | Yokota et al. . | |
| 5,571,972 | 11/1996 | Okada . | |
| 5,723,790 | 3/1998 | Andersson ................... | 73/514.01 |

FOREIGN PATENT DOCUMENTS

| 0 549 807 A1 | 7/1993 | European Pat. Off. . |
| 0 731 357 A1 | 9/1996 | European Pat. Off. . |
| 5-26744 | 2/1993 | Japan . |
| 08035981 | 7/1994 | Japan . |
| WO 89/10567 | 11/1989 | WIPO . |

*Primary Examiner*—Hezron Williams
*Assistant Examiner*—Helen C. Kwok
*Attorney, Agent, or Firm*—Wall Marjama Bilinski & Burr

[57]                     ABSTRACT

A sensor unit is provided for detecting a physical quantity with improved accuracy while maintaining acceptable detection limits. The sensor unit includes at least three three-axis sensors for three-dimensionally detecting the magnitude and direction of a physical quantity wherein the three sensors are disposed in one plane. Each three-axis sensor includes: an operating member; a supporting base having a hollow with the operating member being located at the center of the hollow; and a flexible plate having a piece of piezoelectric material in contact with at least one pair of electrodes and extending across the hollow at an end of the supporting base, the operating member being suspended at the center of the hollow by the flexible plate. The three three-axis sensors are assigned the X, Y, and Z directions, respectively, of a three-dimensional coordinate system so that the physical quantity applied from the outside is detected for each component in the X, Y, and Z directions independently of each other.

16 Claims, 25 Drawing Sheets

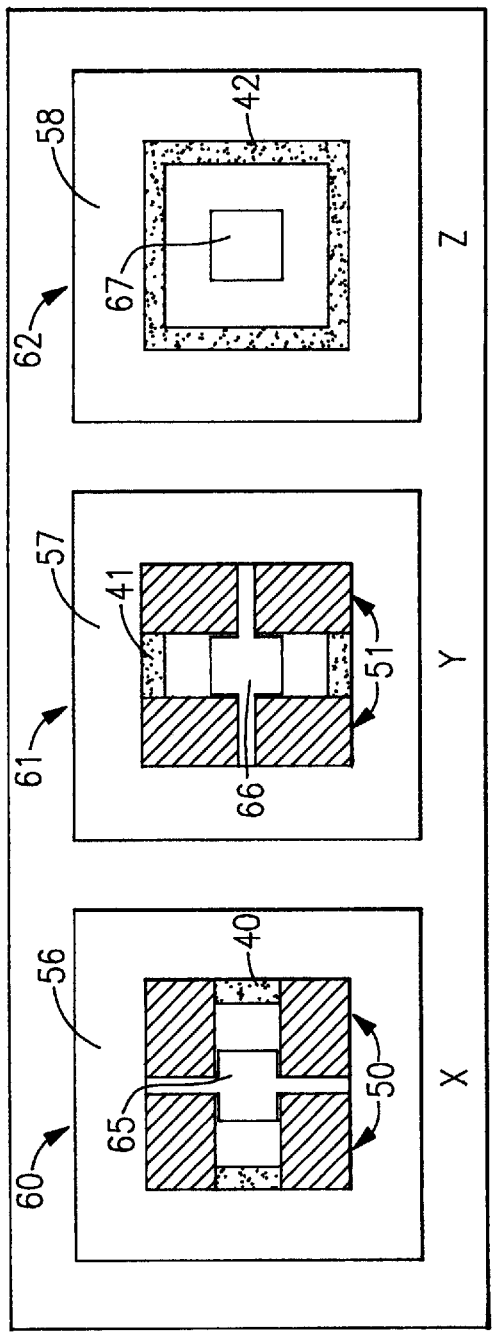
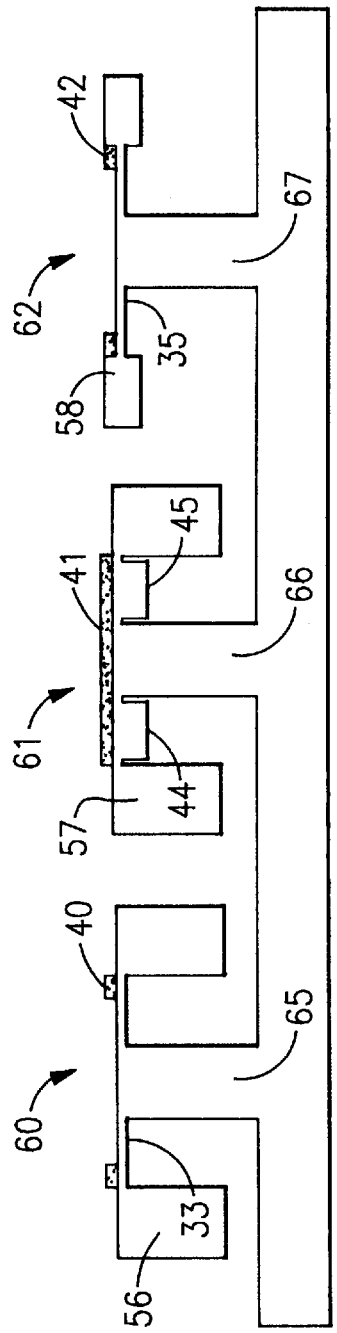
FIG.34(a)
FIG.34(b)

SENSOR UNIT HAVING MULTIPLE SENSORS EACH PROVIDING INDEPENDENT DETECTION OF A FORCE COMPONENT

BACKGROUND OF THE INVENTION

1. Field of the Invention

The present invention relates to a sensor unit with a piezoelectric element for three-dimensionally sensing the magnitude and the direction of a physical quantity applied from the outside.

2. Description of Related Art

In the automobile, mechanical, and related industries, there is an increasing need for a sensor capable of accurately detecting a physical quantity such as force, acceleration, magnetic field, or the like. In particular, there is a need for developing a small-sized sensor capable of detecting such a physical quantity for each of two- or three-dimensional components.

One known technique to realize such a sensor is to dispose a plurality of piezoelectric sensor elements on a flexible plate provided with an operating member (as disclosed in Japanese Patent Application Laid-open No. 5-26744).

In this sensor, the flexible plate is deformed in response to a physical quantity applied from the outside to the operating member, and the piezoelectric element generates a charge corresponding to the deformation of the flexible plate thereby three-dimensionally detecting the magnitude and the direction of the physical quantity using the single sensor unit (hereinafter, this type of sensor is referred to as a "three-axis sensor").

As an example of a three-axis sensor, an acceleration sensor of the type using a weight as an operating member is described below with reference to FIG. 2. As shown in FIG. 2, when an acceleration of a is applied from the outside on the sensor, a weight 1 experiences an inertial force f in a direction opposite to the acceleration a. As a result, a flexible plate 3, which extends in a horizontal direction between the weight 1 and a supporting base 2, has a deformation corresponding to the inertial force f.

Depending on the direction and the amount of the deformation 4, corresponding amount of charges are generated in respective piezoelectric elements 5 disposed on the flexible plate 3. By detecting these charges, it is possible to perform a three-dimensional detection of the acceleration applied from the outside.

This type of sensor is described in further detail below with reference to FIGS. 3(a) and 3(b). In the sensor shown in FIGS. 3(a) and 3(b), the center of the bottom plane of a cylindrical weight 10 to which a flexible plate 12 is attached is defined as the origin O. The plane extending in parallel to the flexible plate 12 passing through the origin O is defined as an X-Y plane, and X and Y axes are defined in this X-Y plane so that X and Y axes are perpendicular to each other. Furthermore, a Z axis is defined so that it extends in a direction perpendicular to the X-Y plane and passes through the origin O.

In this structure, each portion of the piezoelectric material located between one pair of upper and lower electrodes is referred to as a "piezoelectric sensor element". In the specific example of the sensor shown in FIGS. 3(a) and 3(b), four piezoelectric sensor elements each consisting of a particular portion of the piezoelectric material and a pair of electrodes are disposed in the X and Y directions on the flexible plate 12, and additional eight piezoelectric sensor elements for use in detection in the Z direction are disposed.

In this sensor, the respective components of the inertial force f applied on the weight 1 by the external acceleration a are determined by the amounts of charge generated in the respective piezoelectric sensor elements as described below. That is, the X-axis component $f_X$ of the inertial force is detected by the piezoelectric sensor elements $E_1$–$E_4$ as shown in FIG. 4(a). Similarly, the Y-axis component $f_Y$ of the inertial force is detected by the piezoelectric sensor elements $E_5$–$E_8$ (not shown). On the other hand, the Z-axis component $f_Z$, shown in FIG. 4(b), of the inertial force is detected by the piezoelectric sensor elements $E_9$–$E_{12}$ and also by the piezoelectric sensor elements $E_{13}$–$E_{16}$.

The directions of the respective components are determined on the basis of the charge polarity pattern. For instance, as shown in FIG. 4(a), a charge polarity pattern of "+−+−" appears on the upper surface of the piezoelectric material, while a charge polarity pattern of "+−−+" appears on the upper surface of the piezoelectric material in FIG. 4(b), wherein the pattern is seen from left to right in both cases.

From the resultant force of the combination of the detected components $f_X$, $f_Y$, and $f_Z$, the direction and the magnitude of the inertial force f (and therefore the magnitude and direction of the external acceleration a) can be determined in a three dimensional fashion using the single small-sized sensor.

In order for the three-axis sensor to accurately detect the inertial force f, it is required to accurately detect each component $f_X$, $f_Y$, and $f_Z$ in the X, Y, and Z directions, respectively.

However, the detection of one component can be influenced by the presence of other components because the three-axis sensor described above detects each component in the X, Y, and Z directions by means of the single flexible plate having a weight and extending in a horizontal direction.

That is, the detection limit, which is determined by the spring constant of the flexible plate, is further reduced if the single flexible plate is used for detection in both directions. This results in a reduction in the detection range of the sensor.

Although the above problem may be avoided to a certain extent by increasing the hardness or the spring constant of the flexible plate, the result is a reduction in the sensitivity.

SUMMARY OF THE INVENTION

In view of the above, the object of the invention is to provide a technique of increasing the detection accuracy while maintaining high sensitivity.

According to an aspect of the present invention, there is provided a sensor unit comprising at least three three-axis sensors disposed in one plane. The at least three three-axis sensors each comprising: an operating member; a supporting base having a hollow and disposed around the operating member located at the center of the hollow; and a flexible plate having a piece of piezoelectric material in contact with at least one pair of electrodes and extending across the hollow at an end of said supporting base, the operating member being suspended at the center of said hollow by the flexible plate. The flexible plate is deformed in response to the behavior of the operating member which corresponds to a physical quantity applied from the outside. The piece of piezoelectric material generates a charge corresponding to the deformation of the flexible plate thereby three-dimensionally detects the magnitude and the direction of the physical quantity. When a three-dimensional X-Y-Z coordinate system is defined in such a manner that the central point of the flexible plate at which said operating member is suspended is defined as an origin O and a plane parallel to the flexible plate and passing through the origin O is defined as an X-Y plane, the three three-axis sensors are assigned the X, Y, and Z directions, respectively, of the three-dimensional coordinate system so that a physical quantity applied from the outside is detected for each component in the X, Y, and Z directions independently of each other. As a result, the sensor unit is capable of three-dimensionally detecting the magnitude and the direction of the physical quantity.

In the sensor unit according to the present invention, a weight is preferably employed as the operating member for detecting an acceleration applied from the outside.

Furthermore, in the three-axis sensors assigned the X, Y, and Z directions, respectively, each operating member is preferably constrained in motion so that each operating member can move only in a specified direction thereby making each three-axis sensor have an anisotropic sensitivity to the physical quantity applied from the outside. In each of the three-axis sensors assigned the X and Y directions, respectively, high-rigidity portions having a higher bending rigidity than the other portions may be formed on opposite sides of the flexible plate of each three-axis sensor so that the high-rigidity portions are at symmetric locations about the X or Y axis assigned to each three-axis sensor thereby constraining the motion of each operating member.

In each of the three-axis sensors assigned the X and Y directions, respectively, thick portions having a greater thickness than the other portions may be formed on opposite sides of the flexible plate of each three-axis sensor so that the thick portions are at symmetric locations about the X or Y axis assigned to each three-axis sensor thereby constraining the motion of each operating member. The thick portions having a greater thickness than the other portions may be formed on the flexible plate by means of laminate molding into an integral form, by means of a screen printing technique, by means of putting a reinforcing member via an adhesive, or by means of a transfer printing technique.

In each of the three-axis sensors assigned the X and Y directions, respectively, hard portions having a greater hardness than the other portions may be formed on opposite sides of the flexible plate of each three-axis sensor. The hard portions are formed so that they are at symmetric locations about the X or Y axis assigned to each three-axis sensors thereby constraining the motion of each operating member so that each operating member can move in a particular direction in response to a physical quantity applied from the outside. The hard portions having a greater hardness than the other portions may be formed on the flexible plate itself or on the piezoelectric member formed over the entire upper surface of the flexible plate by disposing a hardening agent by means of coating or spraying technique.

In the three-axis sensor assigned the Z direction, the center of gravity of the operating member suspended by the flexible plate of said three-axis sensor is preferably located in the plane of the flexible plate thereby constraining the motion of each operating member. As a result, each operating member can move in a particular direction in response to a physical quantity applied from the outside. To this end, the operating member may be formed so that it has a symmetric shape about the X-Y plane.

According to another aspect of the present invention, there is provided a sensor unit comprising two three-axis sensors disposed in one plane. The two three-axis sensors each comprising: an operating member; a supporting base having a hollow and disposed around the operating member located at the center of the hollow; and a flexible plate having a piece of piezoelectric material in contact with at least one pair of electrodes and extending across the hollow at an end of the supporting base. The operating member is suspended at the center of the hollow by the flexible plate. The flexible plate is deformed in response to the behavior of the operating member corresponding to a physical quantity applied from the outside. The piece of piezoelectric material generates a charge corresponding to the deformation of the flexible plate thereby three-dimensionally detecting the magnitude and the direction of the physical quantity. Moreover, two-dimensional X-Y coordinate system is defined in such a manner that the central point of the flexible plate at which the operating member is suspended is defined as an origin O, and a plane parallel to the flexible plate and passing through the origin O is defined as an X-Y plane. The two three-axis sensors are assigned the X and Y directions, respectively, of the two-dimensional coordinate system so that a physical quantity applied from the outside is detected for each component in the X and Y directions independently of each other. Thus, the sensor unit can detect two-dimensionally the magnitude and the direction of the physical quantity.

In this sensor unit according to the invention, a weight is preferably employed as the operating member for detecting an acceleration applied from the outside.

Furthermore, In each of the three-axis sensors assigned the X and Y directions, respectively, of the sensor unit, each operating member is preferably constrained in motion so that each operating member can move only in a specified direction thereby making each three-axis sensor have an anisotropic sensitivity to the physical quantity applied from the outside. In each of the three-axis sensors assigned the X and Y directions, respectively, high-rigidity portions having a higher bending rigidity than the other portions may be formed on opposite sides of the flexible plate of each three-axis sensor so that the high-rigidity portions are at symmetric locations about the X or Y axis assigned to each three-axis sensor thereby constraining the motion of each operating member.

BRIEF DESCRIPTION OF THE DRAWINGS

FIGS. 34(a)(b) are schematic diagrams of an embodiment of a sensor unit according to the present invention, wherein a top view is given in FIG. 34(a) and a see-through view seen from the front side is given in FIG. 34(b).

DESCRIPTION OF THE PREFERRED EMBODIMENTS

In the present invention, a sensor unit is produced by properly combining a plurality of three-axis sensors. Therefore, before describing the sensor unit, a single three-axis sensor used in the invention is first described with reference to the accompanying drawings.

Figure 3A:
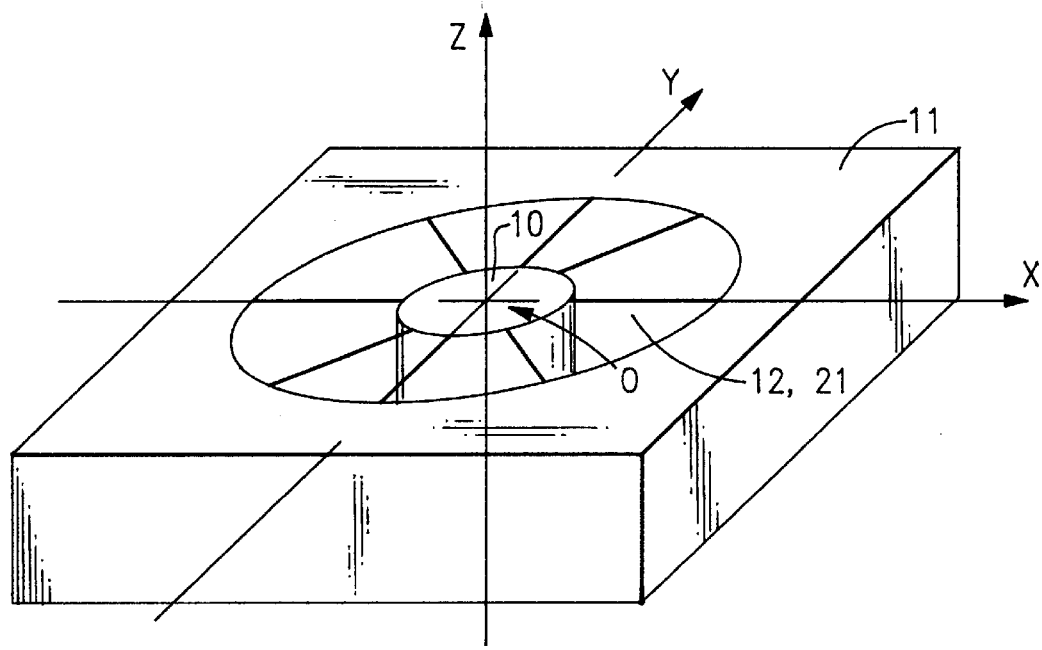
FIGS. 3(a)(b) are perspective view and a top view, respectively, of an embodiment of a three-axis sensor used in the invention.

As shown in FIGS. 3(a)(b) and 5(a)(b), the single three-axis sensor comprises: an operating member 10; a supporting base 11 having a hollow and disposed around the operating member 10 located at the center of the hollow; one or more flexible plates 12 each having a piece of piezoelectric material in contact with at least one pair of electrodes and extending across the hollow at an end of the supporting base 11, the operating member 10 being suspended at the center of the hollow by the flexible plates 12; (hereinafter this basic type of sensor is referred to as a "standard" type sensor"). Alternatively, the sensor may comprise, as shown in FIGS. 6(a) and 6(b), a supporting column 13; one or more flexible plates 14 having a piece of piezoelectric material in contact with a pair of electrodes and extending in a horizontal direction from the supporting column 13 located at the central position; and operating members 15 suspended at the end of the respective flexible plates 14 (hereinafter this basic type of sensor is referred to as an umbrella-shaped sensor).

Figure 6A:
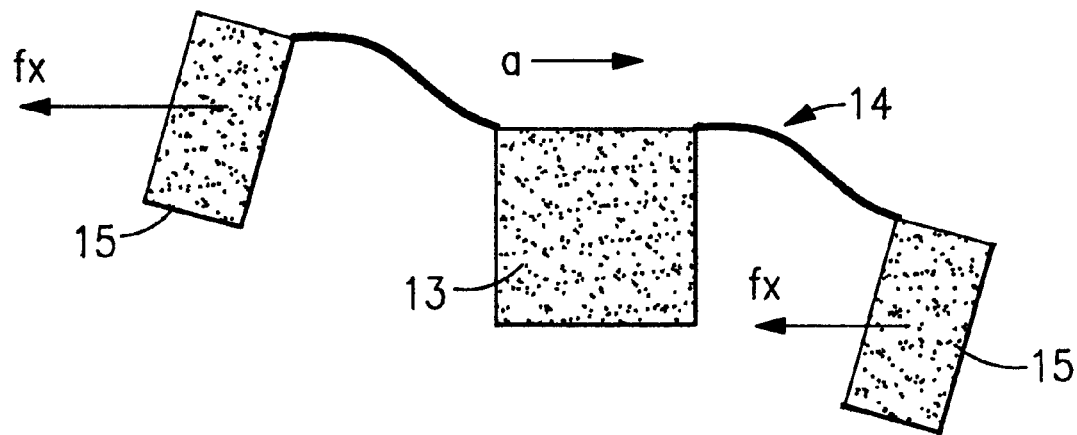
FIGS. 6(a)(b) are schematic diagrams conceptually illustrating the operation of a three-axis sensor used in the invention.
Figure 6B:
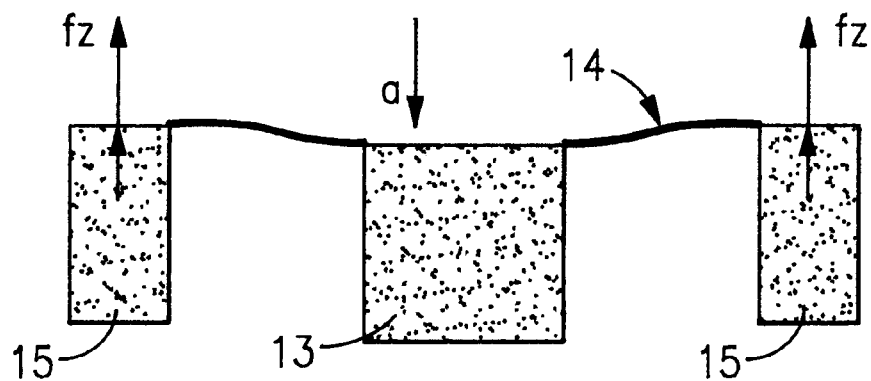

In the umbrella-shaped sensor, the weight 15 serving as the operating member behaves in such a manner as shown in FIG. 6(a) in response to acceleration $a_X$ or $a_Y$ in the X-Y plane, while it behaves in such a manner as shown in FIG. 6(b) in response to acceleration $a_Z$ in a direction along the Z axis, and thus the magnitude and the direction of the acceleration a applied from the outside can be detected as in the standard type.

In the umbrella-shaped sensor, it is generally easier to employ a weight having a greater volume and thus having a greater mass than in the standard type. Therefore, in the umbrella-shaped sensor, the flexible plate can be deformed to a greater degree, which results in a higher sensitivity.

In the present invention, the supporting base 11 disposed around the operating member 10 is a member responsible for supporting the flexible plate 12 and the operating member 10. There are no special limitations in its shape and material as long as it has a mechanical strength high enough to support the flexible plate 12 and the operating member 10.

Figure 3B:
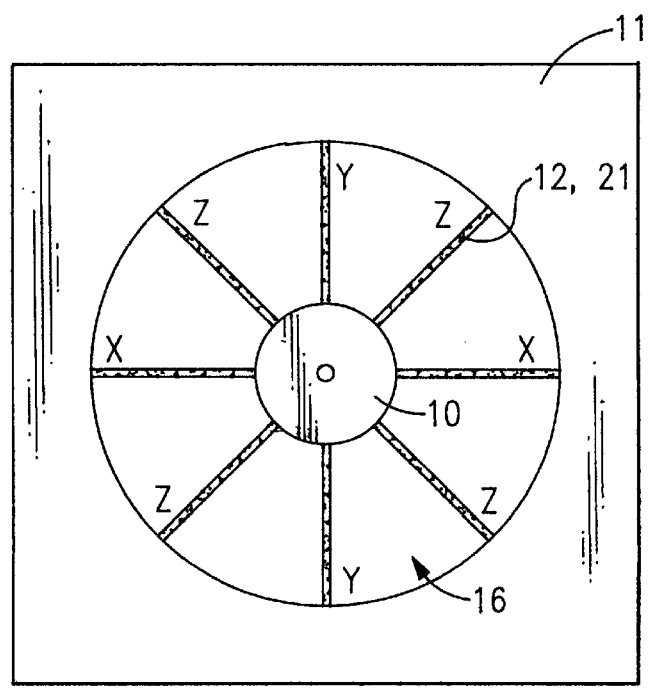
Figure 7:
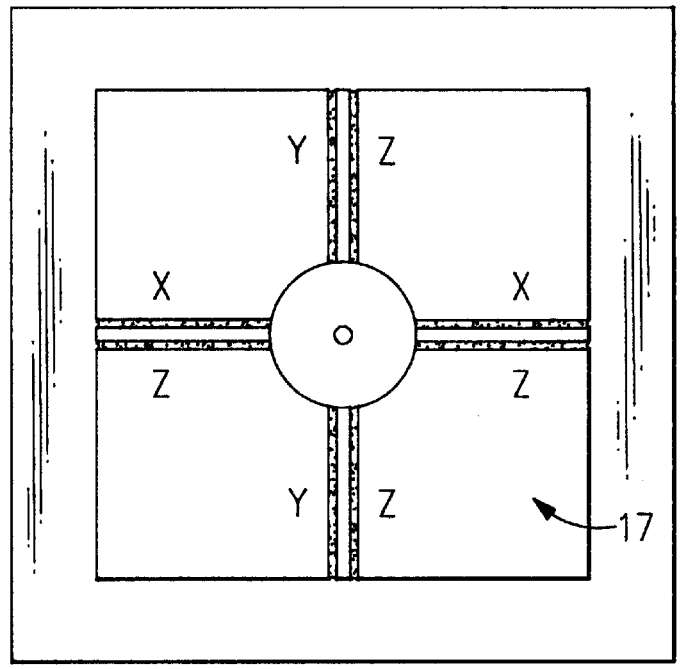
FIG. 7 is a top view illustrating the operation of an embodiment of a three-axis sensor used in the invention.
Figure 8:
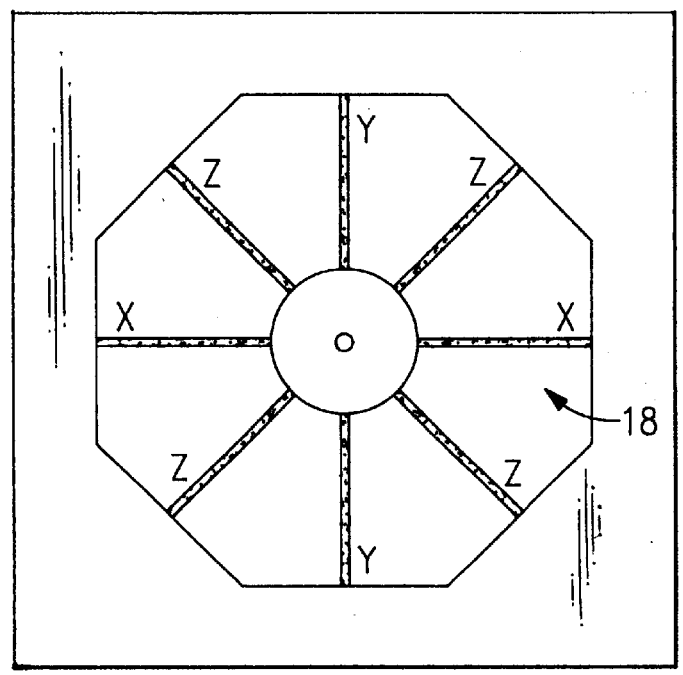
FIG. 8 is a top view illustrating the operation of an embodiment of a three-axis sensor used in the invention.
Figure 9:
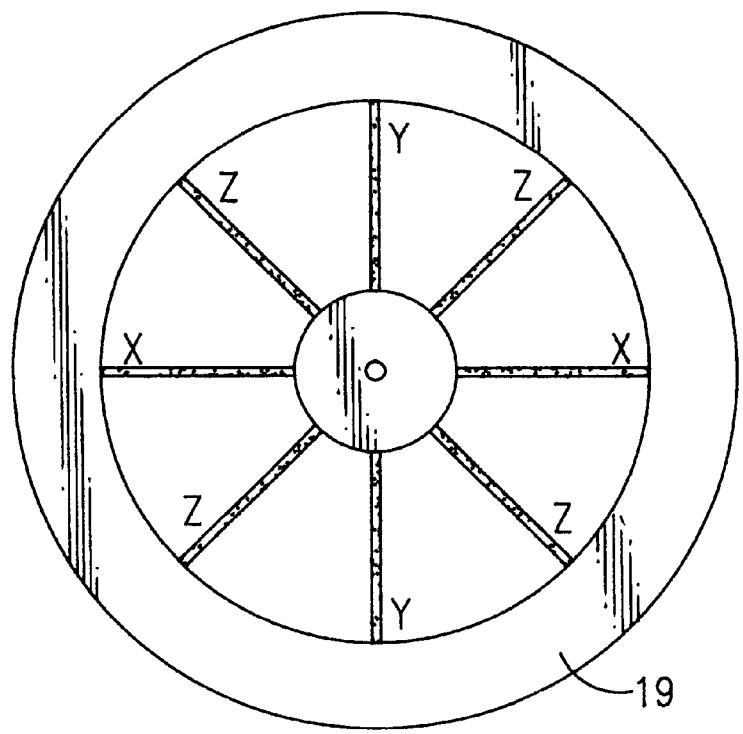
FIG. 9 is a top view illustrating the operation of an embodiment of a three-axis sensor used in the invention.

The shape of the supporting base 11 is defined by its outer shape and also by the inner shape of the hollow. For example, when the supporting base 11 is square in the outer shape, the hollow may be formed into a cylindrical shape 16 as shown in FIG. 3(b), or into a square shape 17 as shown in FIG. 7, or otherwise into an octagonal shape 18 as shown in FIG. 8. The outer shape may also be cylindrical as shown in FIG. 9.

In general, the acceleration is applied in a rather symmetrical fashion in the X-Y plane. If this fact is taken into consideration, it is more desirable that the supporting base 11 be cylindrical in both the outer and inner shapes as shown in FIG. 9.

In the case of the umbrella-shaped type, the supporting column 13 plays a similar role to that of the supporting base 11. The supporting column 13 may be formed into a cylindrical, polygonal, or other proper shape. The supporting column 13 may also be made of a similar material to that employed for the supporting base 11.

It is preferable that the material of the supporting base 11 be rigid to a proper degree so that the supporting base 11 is not deformed to a great degree when an external acceleration is applied. This ensures that the sensor can accurately detect the behavior of an object (such as a car) on which the sensor is installed. This also allows the sensor to have a higher sensitivity.

Conversely, a material which will absorb the behavior of the object to be sensed will result in reductions in the sensitivity and the reliability, and thus such a material is unsuitable. For example, metal and ceramic having a high rigidity are preferable materials. Of these two materials, ceramic is more preferable in that it is not easily influenced by electromagnetic waves.

Figure 10:
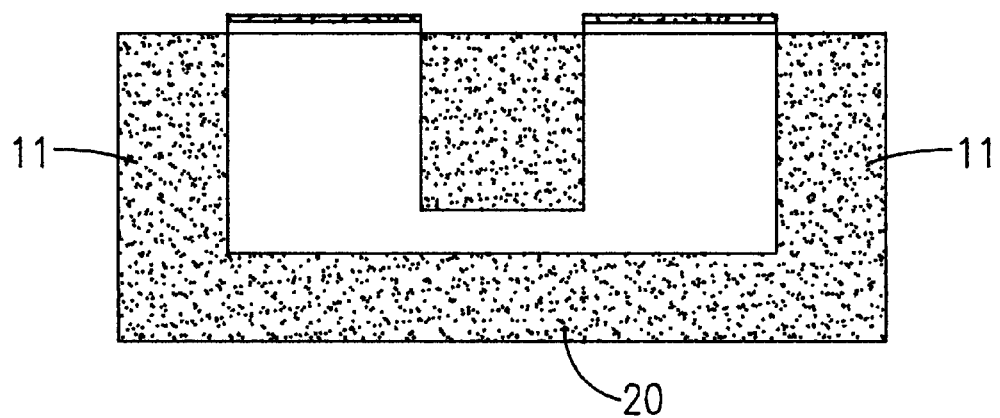
FIG. 10 is a see-through view, seen from the front side, of an embodiment of a three-axis sensor used in the invention.

To increase the rigidity of the supporting base, it is desirable that the hollow of the supporting base 11 be closed at its one end as shown in FIG. 10. In the case where the supporting base 11 has a bottom plate 20, the structure has an additional advantage that the sensor can be easily mounted on an object to be detected.

In the present invention, the operating member 10 may be made up of a rod-shaped material if the physical quantity applied on the operating member 10 is a mechanical force, a magnetic material for a magnetic force, or a weight for an acceleration. The sensor of the invention may be used in a most preferable fashion as an acceleration sensor, and thus it is assumed hereinafter that the operating member 10 is formed into a weight shape.

The weight 10 is a member suspended by the flexible plate 12 in such a manner that the flexible plate 12 is deformed by the force exerted on the weight 10 by a magnitude and into a direction corresponding to an external acceleration applied on the weight 10. The weight 10 has no special limitations in the shape and material as long as the above purpose is achieved. The weight 10 may be bonded to the flexible plate 12 via an adhesive or the like or may be formed into a single structure integral with the flexible plate 12.

Figure 12:
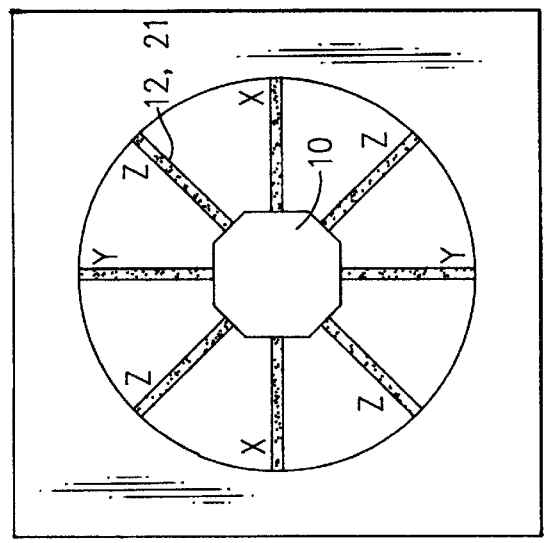
FIG. 12 is a top view illustrating the operation of an embodiment of a three-axis sensor used in the invention.
Figure 11:
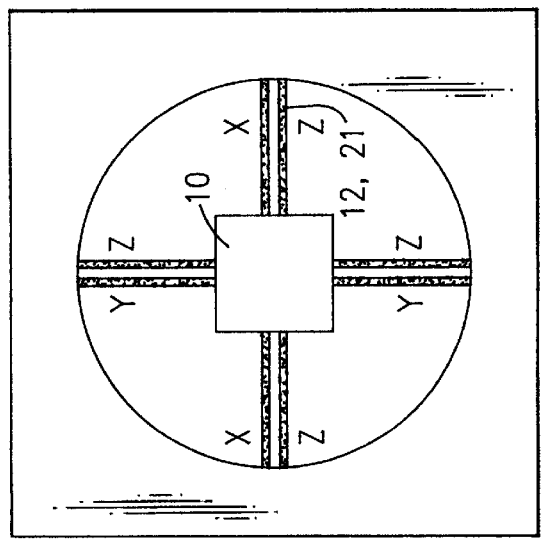
FIG. 11 is a top view illustrating the operation of an embodiment of a three-axis sensor used in the invention.

More specifically, the weight may be formed into a cylindrical shape as shown in FIG. 3(b), a rectangular shape as shown in FIG. 11, or an octagonal shape as shown in FIG. 12. The cylindrical shape such as that shown in FIG. 3(b) is preferable in that this structure is symmetric to a high degree in terms of the detection of the acceleration in the X-Y plane. More preferably, the weight may be formed into a truncated cone shape whose external diameter increases with the distance measured from the flexible plate 12 toward the bottom of the supporting base 11, or into a stepped-diameter cylindrical shape in which the diameter of the lower portion is greater than that of the upper portion. These structures have the advantage that the center of gravity is far from the flexible plate 12.

In the case of the umbrella-shaped basic type, the weight may be formed for example into a shape being rectangular in the outer sides and having a cylindrical hollow similar to the shape of the supporting base 11 employed in the standard type sensor shown in FIG. 3(b).

It is preferable that the weight 10 be made of a material having a sufficiently large mass and having a high density so that the weight 10 can generate a great force in response to an acceleration applied from the outside thereby deforming the flexible plate 12 to a great degree, which results in a high sensitivity.

For example, metal and ceramic are preferable materials for this purpose. Of these two materials, ceramic is more preferable in that it is not easily influenced by electromagnetic waves and it is lower in the thermal expansion coefficient.

In the present invention, the flexible plate 12 is a plate-shaped member with a piezoelectric material, disposed across the hollow at an end of the supporting base 11 and suspending a weight 10 at the center of the hollow or otherwise extending outward from the supporting column 13 located at the center and having a weight 15 at the end of the flexible plate. In response to the magnitude and direction of an external acceleration, the weight 10 or 15 generates a force thereby deforming the flexible plate 12 or 14 to a corresponding degree, which in turn generates a corresponding charge in the piezoelectric material. Thus it is possible to make a three-dimensional detection of the physical quantity on the basis of the amount of the generated charge and the charge polarity pattern.

Although the flexible plate 12 or 14 has no special limitations in the shape and material, as long as it has a sufficient flexibility and a mechanical strength high enough not to be broken by the behavior of the weight 10 or 15. It is preferable that an elastic deformation easily occurs in the flexible plate 12 or 14 so that the sensor has a high sensitivity.

More specifically, metal, ceramic, glass, and resin may be employed as the material for the flexible plate 12 or 14. Of these materials, ceramic is most preferable because it is high in the modulus of elasticity. Thus it can generate a high stress in the piezoelectric material. When the flexible plate is made of a conductive material such as metal, it is required to make isolation between the flexible plate and the electrodes on the piezoelectric material.

Figure 13:
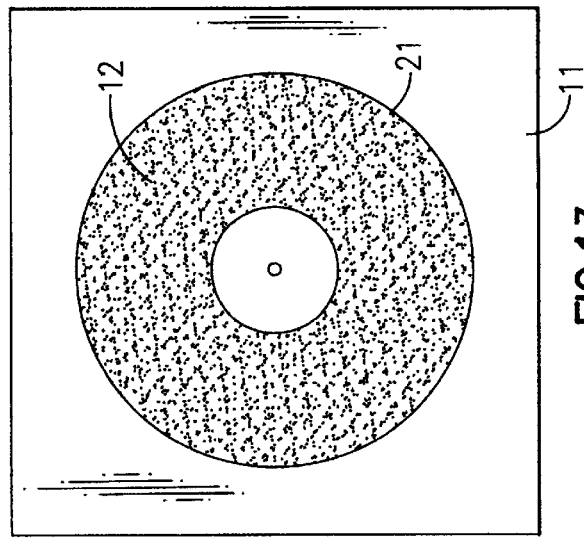
FIG. 13 is a top view illustrating the operation of an embodiment of a three-axis sensor used in the invention.

Alternatively, the entire flexible plate 12 may be made up of a piezoelectric material 21 as shown in FIG. 13.

As for the shape, the flexible plate may be formed either of a single plate as shown in FIG. 6(b) or of a plurality of long plates extending in radial directions between the weight 10 and the supporting base 11 as shown in FIG. 3(b) or between the supporting column 13 and the weight 15.

However, the structure comprising a plurality of long plates such as that shown in FIG. 3(b) is more preferable because this structure allows easier deformation of the flexible plate 12 or 14.

In the case where a plurality of long plates are employed, they are needed to be disposed so that they extend in radial directions from the center of the upper surface of the weight 10 and so that they are symmetric in terms of the detection of the acceleration in the X-Y plane. The number of long plates, the width thereof, the manner in which they extend may be properly determined depending on the number of piezoelectric sensor elements 21, the manner in which they are disposed, and the shape of the supporting base 11.

For example, as shown in FIG. 3(b), eight long plates may be disposed so that they extend in radial directions from the center of the upper surface of the weight 10. In the case where charges are detected in directions along axes X, Y, and Z independently of each other, at least two long plates for each axis and thus six long plates in total are enough for the detection. If long plates disposed in the X and Y directions are also used for detection in the Z direction, the total number of long plates may be reduced to four as shown in FIG. 14.

Figure 15:
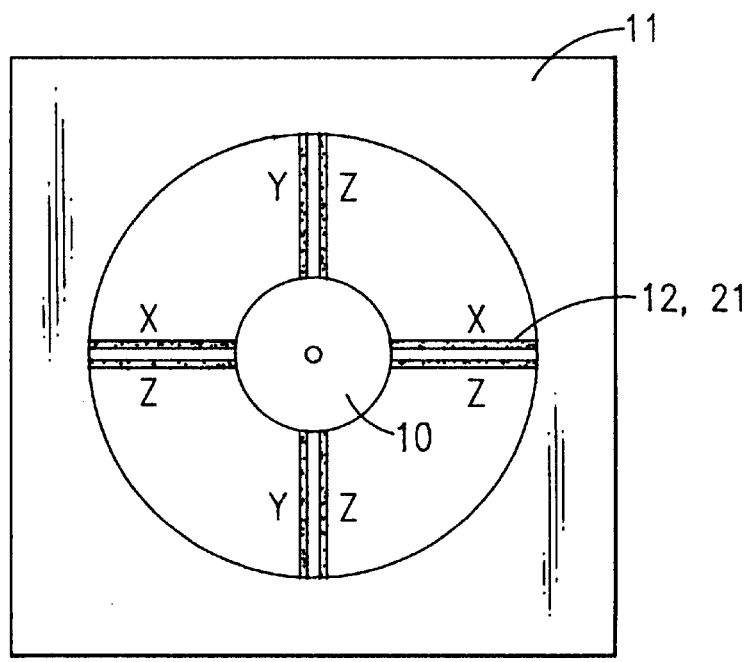
FIG. 15 is a top view illustrating the operation of an embodiment of a three-axis sensor used in the invention.

Alternatively, a plurality of long plates may be disposed in parallel in each direction as shown in FIG. 15.

Figure 14:
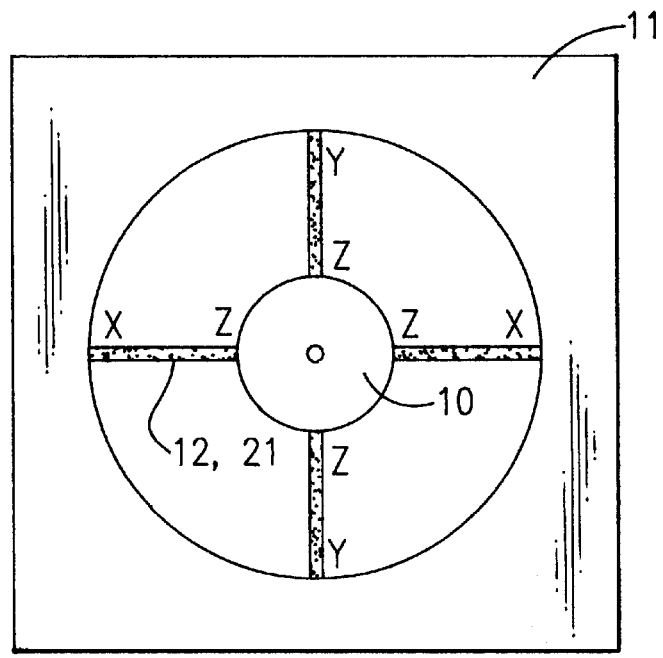
FIG. 14 is a top view illustrating the operation of an embodiment of a three-axis sensor used in the invention.

However, the structure shown in FIG. 14 in which there are four long plates is more preferable because of its simple interconnection and easy process required for adjustment.

A piezoelectric material is disposed on the flexible plate in such a manner that the piezoelectric material is in contact with at least one pair of electrodes. When an acceleration is applied from the outside on the weight, the weight generates a force which deforms the flexible plate. The piezoelectric material generates a charge corresponding to the deformation of the flexible plate thereby detecting the magnitude and the direction of the acceleration.

Preferable piezoelectric materials which can be employed in the present invention include piezoelectric ceramic such as PZT, PMN and PNN and organic piezoelectric materials. Of these, PZT is more preferable because it has good piezoelectric characteristics.

Figure 5A:
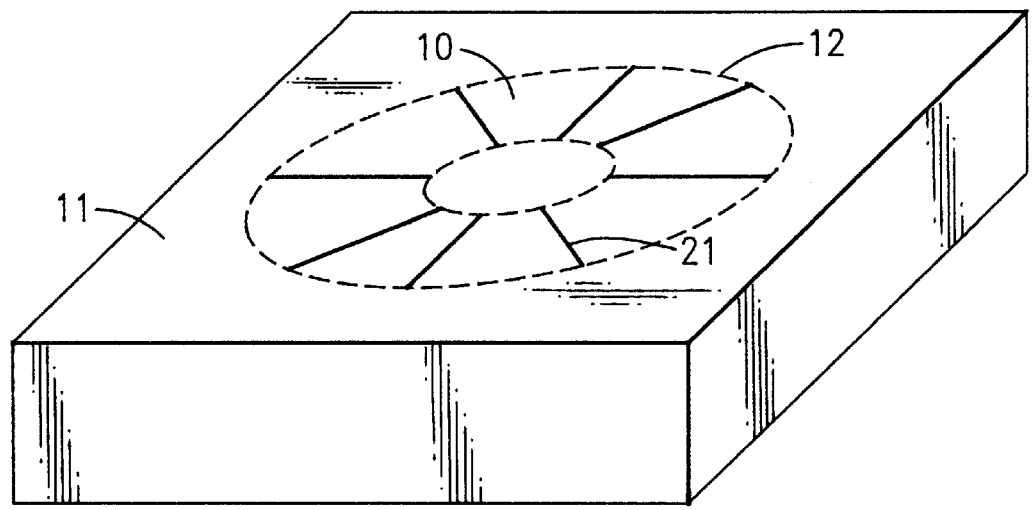
FIGS. 5(a)(b) are perspective view and a top view, respectively, of an embodiment of a three-axis sensor used in the invention.
Figure 5B:
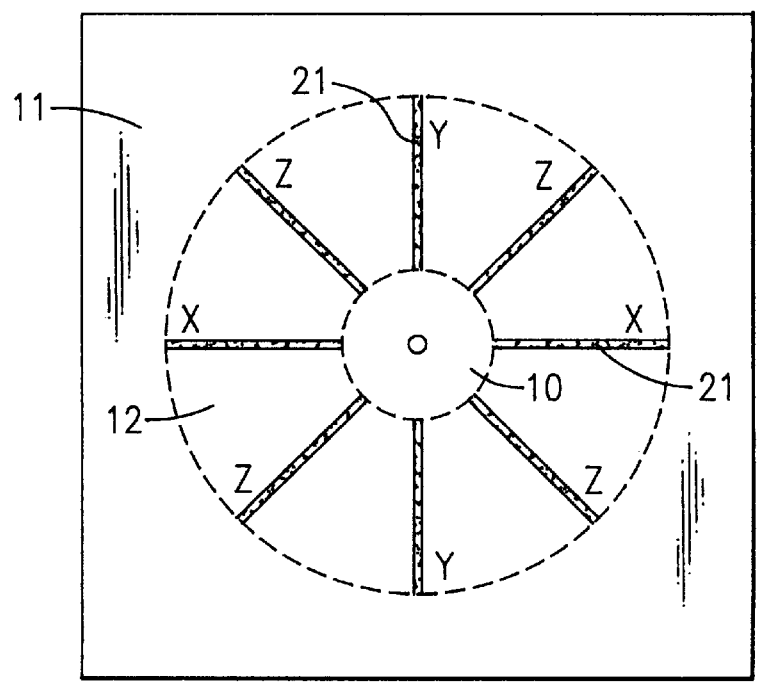

The circular flexible plate or long plate-shaped flexible plates may themselves be formed of a piezoelectric material. Instead, a piezoelectric material may be disposed across the entire upper surface of the single circular flexible plate 12 disposed on the upper surface of the supporting base 11 as in the case of FIG. 13, or a piezoelectric material may be disposed on the entire upper surface of each of the plurality of long plate-shaped flexible plates 12 extending in radiation directions as shown in FIGS. 3(a)(b). In the structure shown in FIGS. 5(a)(b), plural pieces of piezoelectric materials are disposed on the circular flexible plate 12 such that they extend in radial directions from the origin O at the center of the weight 10.

A pair of electrodes are disposed so that the upper and lower surfaces of the piezoelectric materials are in contact with the respective electrodes thereby realizing piezoelectric sensor elements.

In the case where piezoelectric materials are disposed in radiation directions, if charges are detected in the directions along the axes X, Y, and Z independently of each other, then at least two piezoelectric elements for each axis and thus six piezoelectric elements in total are enough for the detection. If the piezoelectric elements in the X and Y directions are also used for detection in the Z direction, the number of piezoelectric elements may be reduced to four as in the case of the structure shown in FIG. 14.

Furthermore, a plurality of piezoelectric elements may also be disposed in parallel in each direction as in the case of FIG. 15.

Figure 16:
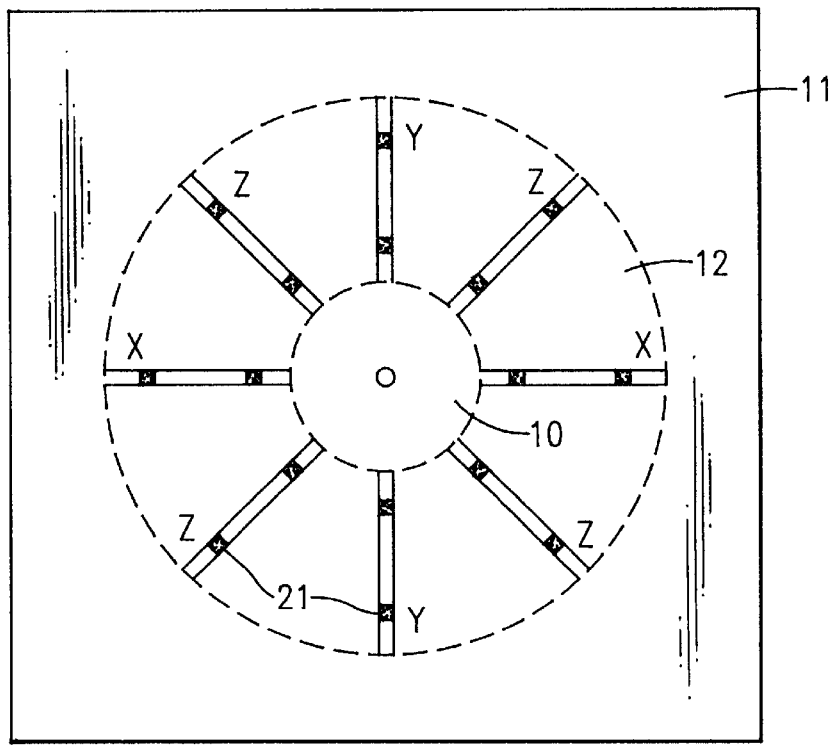
FIG. 16 is a top view illustrating the operation of an embodiment of a three-axis sensor used in the invention.
Figure 17:
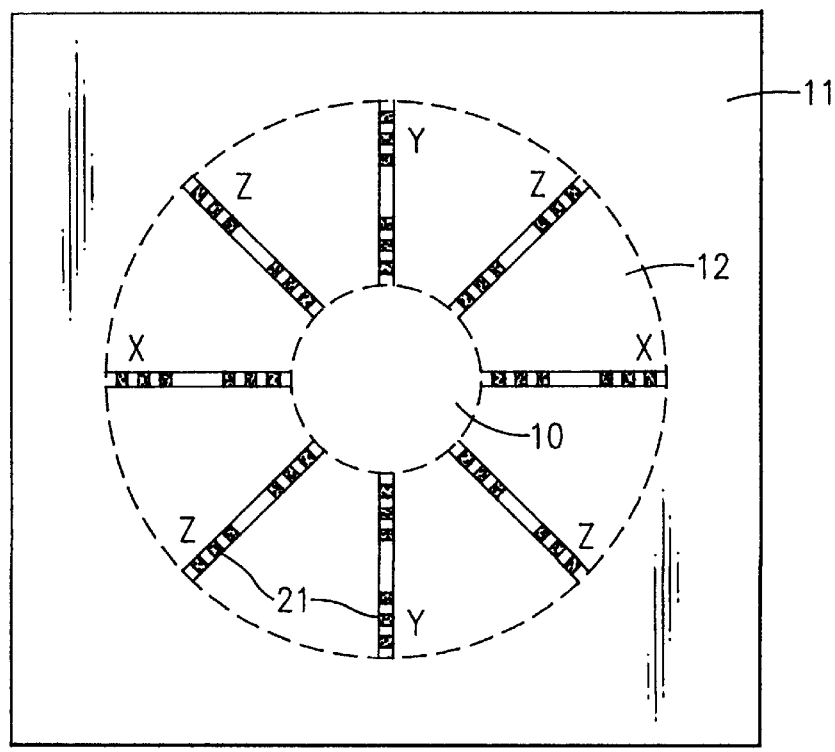
FIG. 17 is a top view illustrating the operation of an embodiment of a three-axis sensor used in the invention.

It is not necessarily required that each piezoelectric element consists of a single piece of piezoelectric material disposed in a continuous fashion. The piezoelectric sensor elements may also be realized with a plurality of pieces of smaller-sized piezoelectric materials 21 so that each piece of piezoelectric material forms one piezoelectric sensor element as shown in FIG. 16 or 17.

Figure 18:
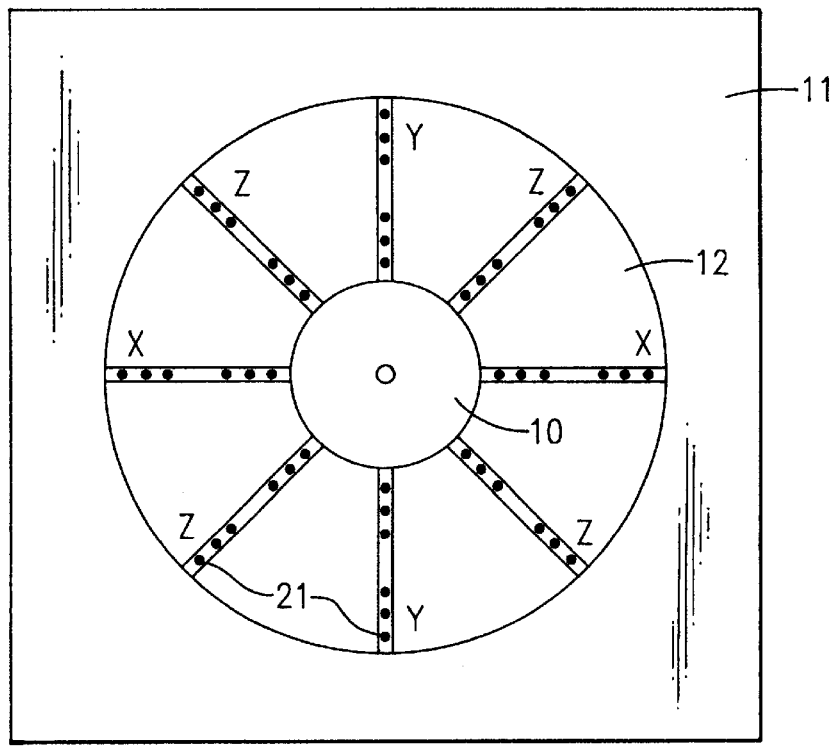
FIG. 18 is a top view illustrating the operation of an embodiment of a three-axis sensor used in the invention.
Figure 19:
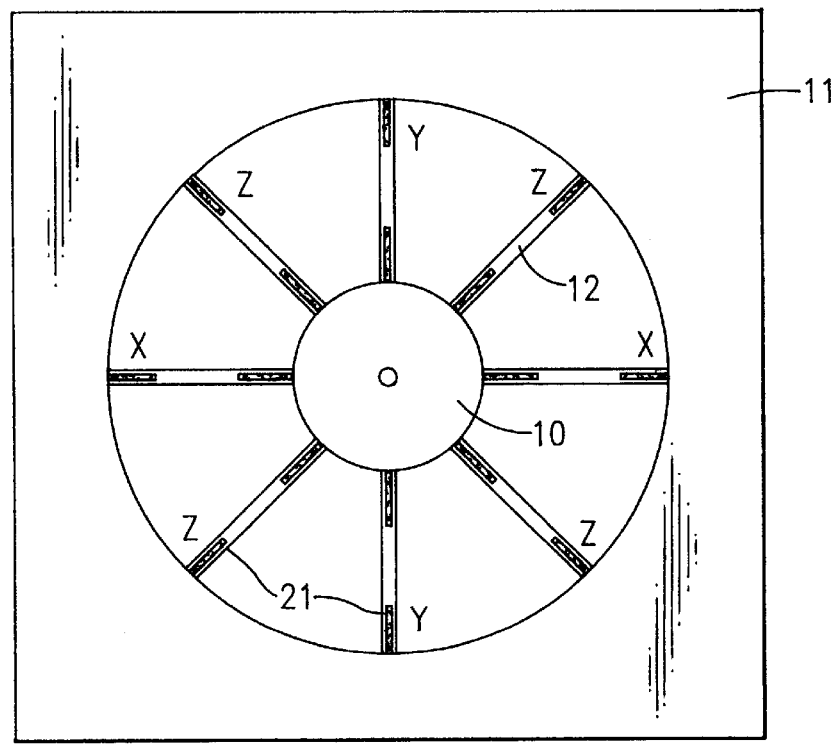
FIG. 19 is a top view illustrating the operation of an embodiment of a three-axis sensor used in the invention.

In this case, the respective pieces of electric materials 21 may be formed into any desired shape. For example, they may be formed into a rectangular shape as shown in FIG. 16 or 17, or into a circular shape as shown in FIG. 18. Otherwise, the respective pieces of piezoelectric materials 21 may be formed into a strip shape as shown in FIG. 19.

Figure 20:
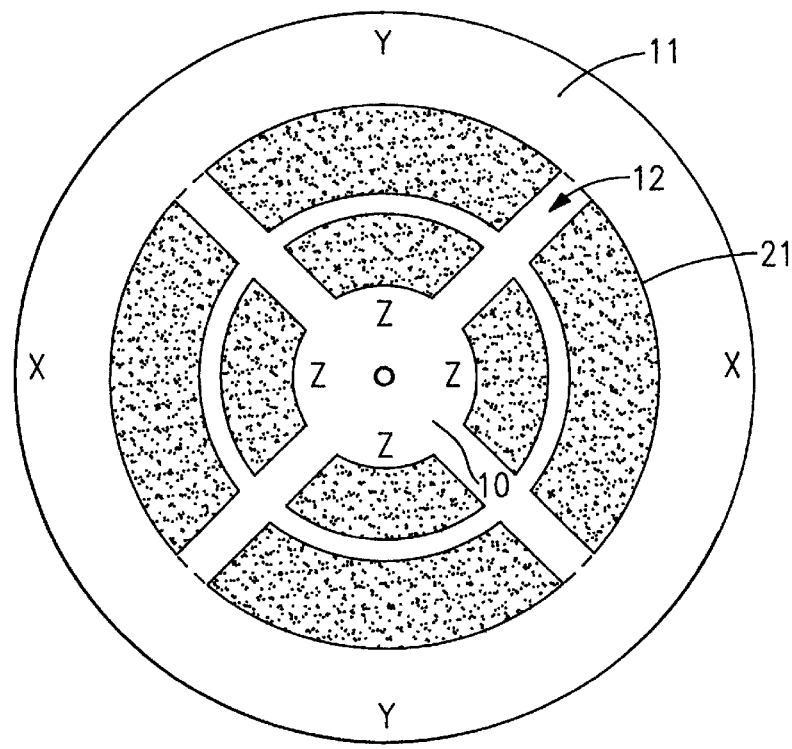
FIG. 20 is a top view illustrating the operation of an embodiment of a three-axis sensor used in the invention.
Figure 21:
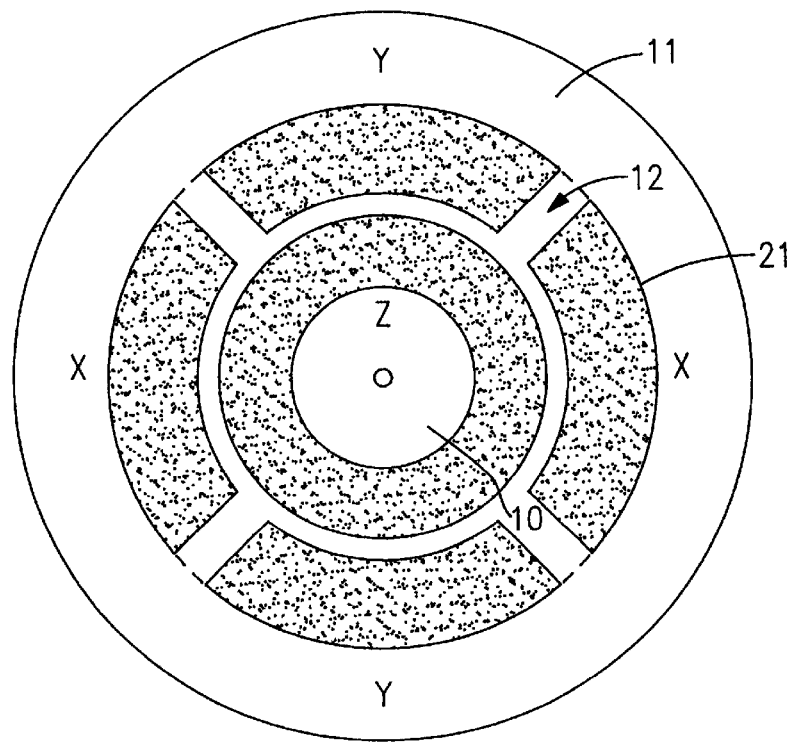
FIG. 21 is a top view illustrating the operation of an embodiment of a three-axis sensor used in the invention.
Figure 22:
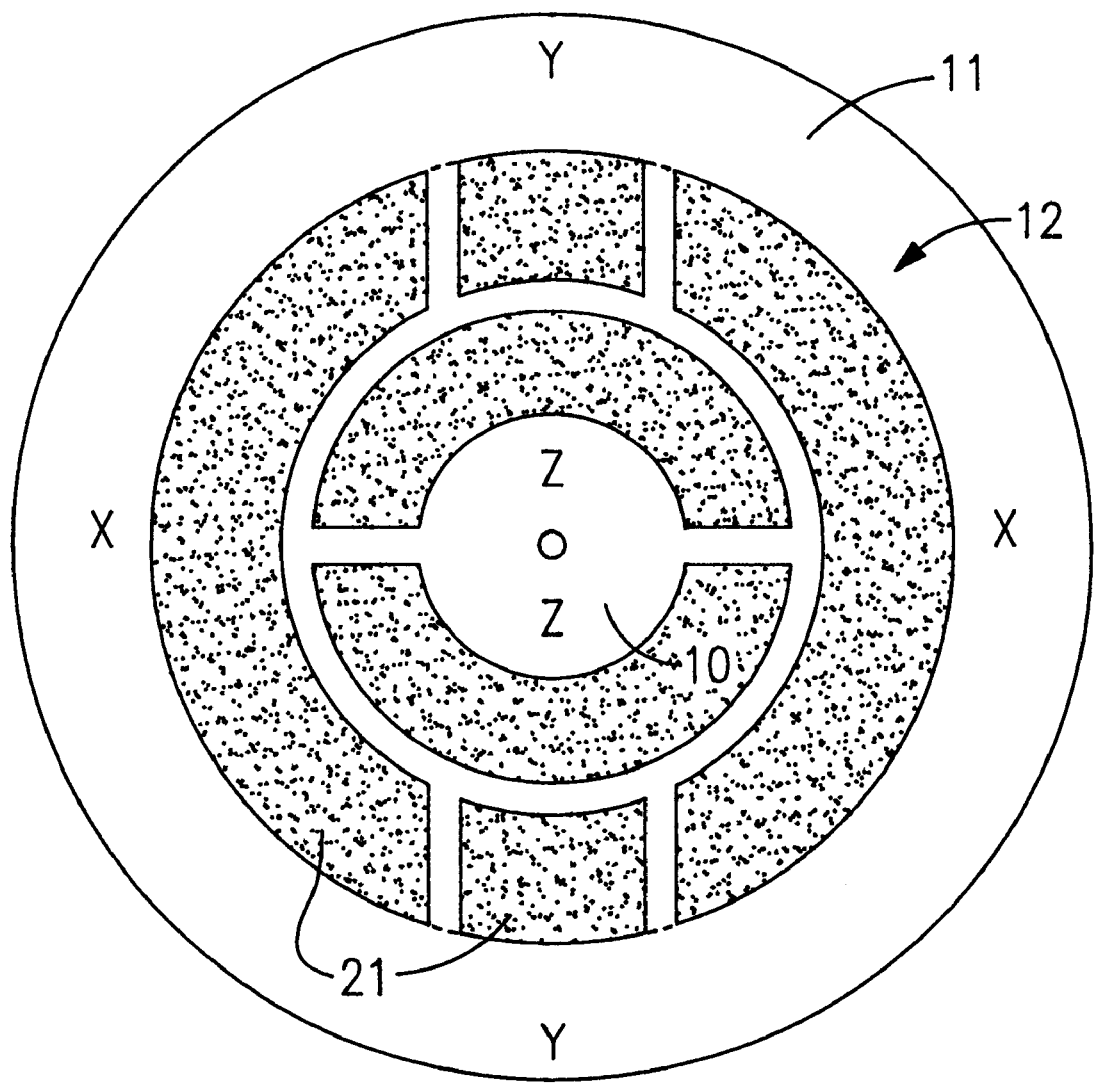
FIG. 22 is a top view of an embodiment of a three-axis sensor used in the invention.

When a circular-shaped flexible plate is employed, piezoelectric materials 21 may be disposed into the shape of fans or into a pattern generated by dividing a circle into a plurality of parts, as shown in FIGS. 20–22. In the example shown in FIG. 20, two piezoelectric elements are disposed in each of X and Y directions and four piezoelectric elements are disposed for use of detection in the Z direction. In the example shown in FIG. 21, two piezoelectric elements are disposed in each of X and Y directions, and one piezoelectric material is disposed for use of detection in the Z direction. On the other hand, in the example shown in FIG. 22, two piezoelectric elements are disposed in each of X and Y directions and two piezoelectric elements are disposed for use of detection in the Z direction.

Figure 23:
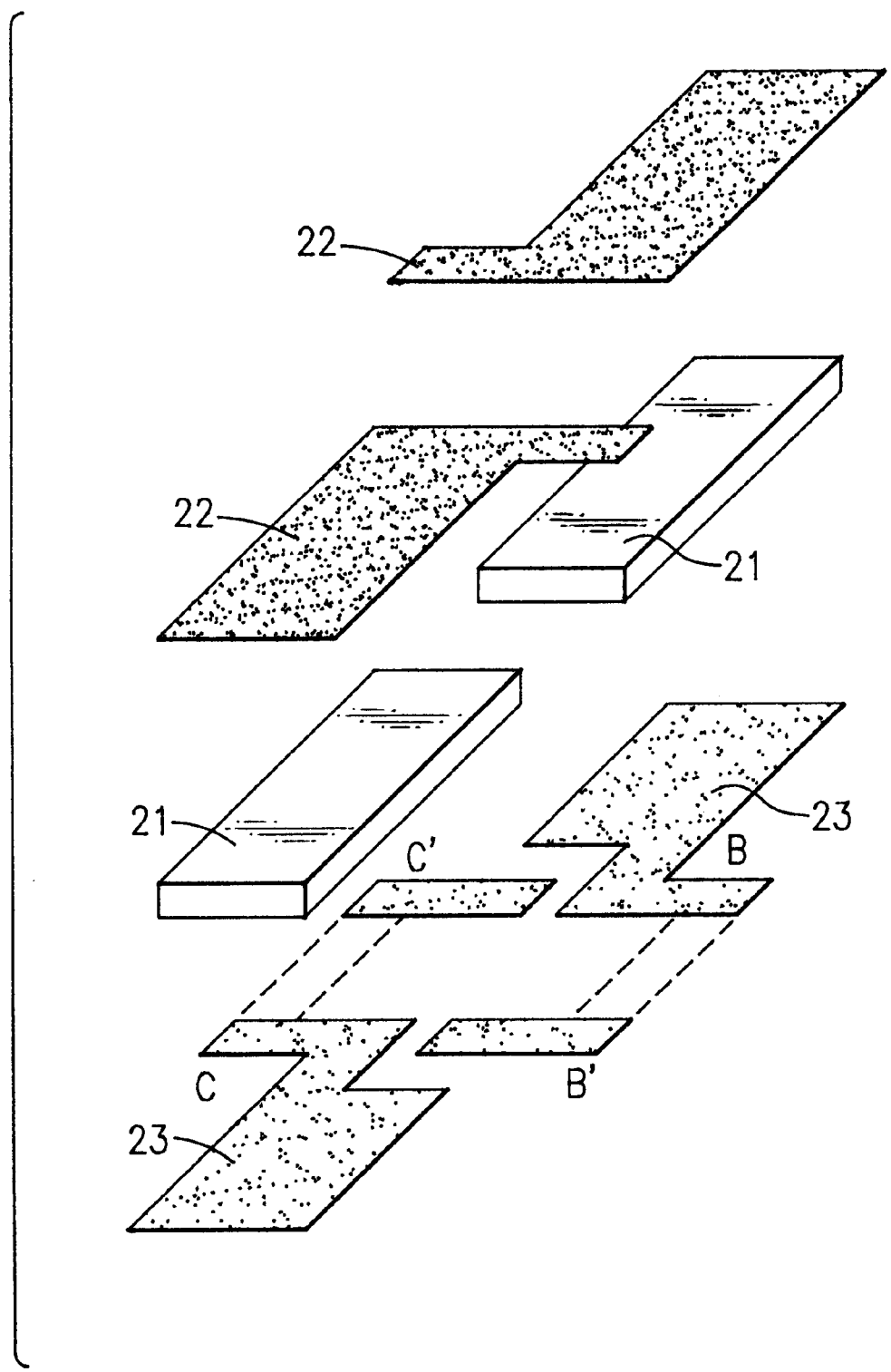
FIG. 23 is a perspective view illustrating an example of the layout of electrodes and piezoelectric materials in a three-axis sensor used in the invention.
Figure 24:
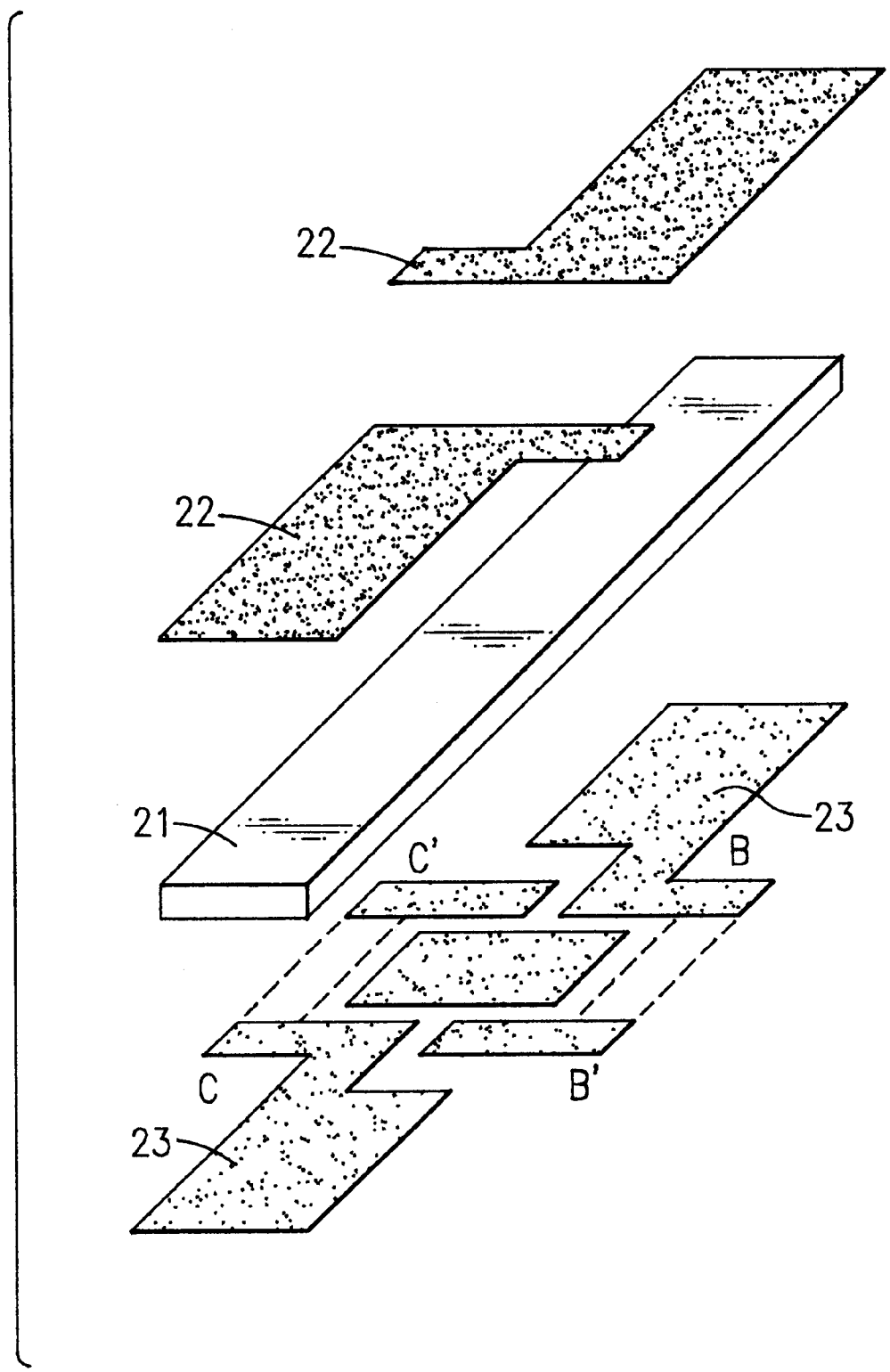
FIG. 24 is a perspective view illustrating an example of the layout of electrodes and piezoelectric materials in a three-axis sensor used in the invention.
Figure 25:
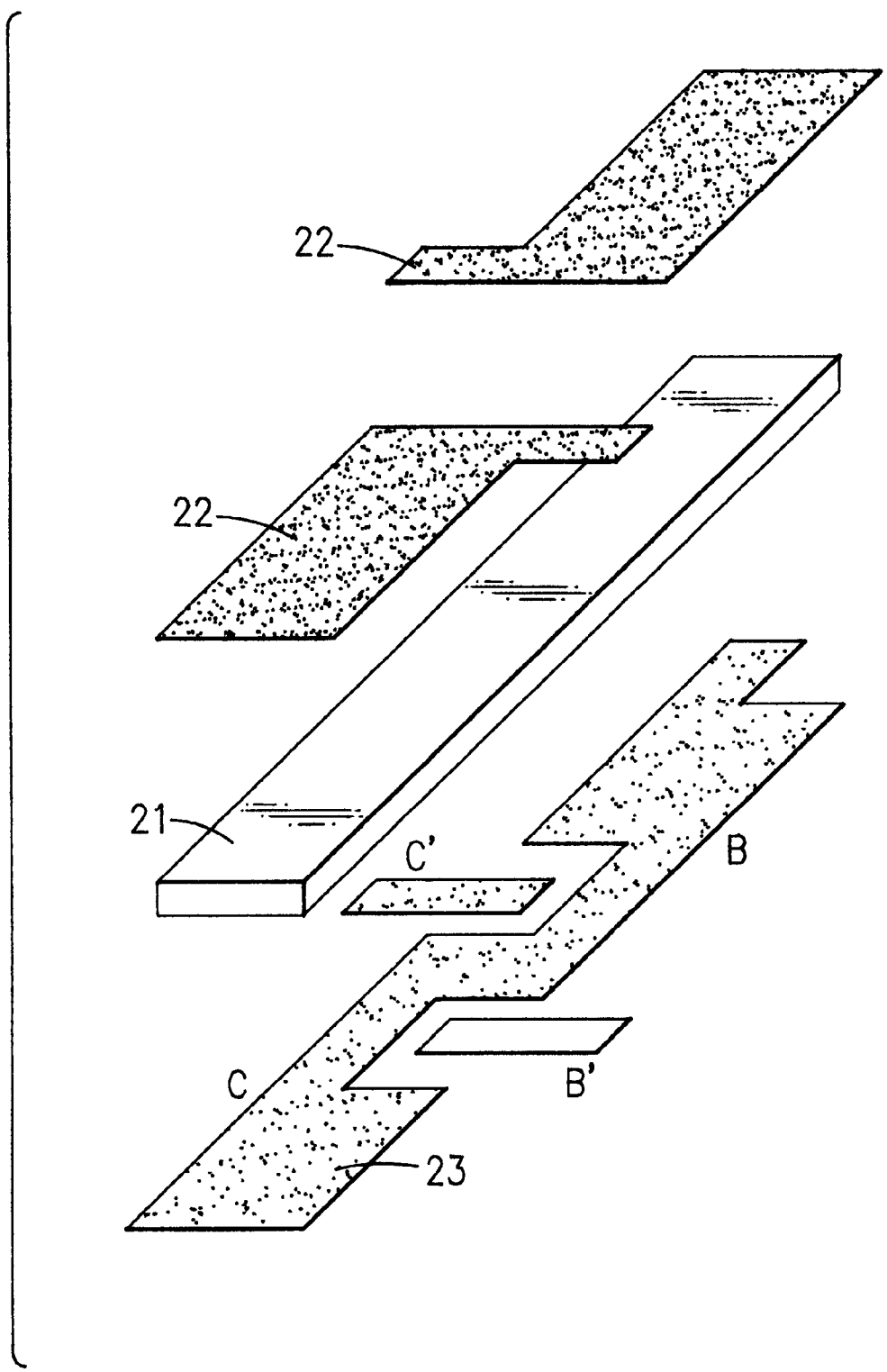
FIG. 25 is a perspective view illustrating an example of the layout of electrodes and piezoelectric materials in a three-axis sensor used in the invention.

Each piece of piezoelectric element is disposed in such a manner that it is located at least between a pair of upper and lower electrodes and it is in contact with the respective electrodes. As described above, the portion of each piezoelectric material located between the upper and lower electrodes acts as a "piezoelectric sensor element". This means that the number of piezoelectric sensor elements may be increased not only by increasing the number of pieces of piezoelectric materials but also by increasing the number of electrodes in contact with the piezoelectric materials. For example, two piezoelectric sensor elements may be formed either of two separate pairs of upper electrodes 22 and lower electrodes 23 and two separate pieces of piezoelectric materials 21 as shown in FIG. 23, or of two separate pairs of upper electrodes 22 and lower electrodes 23 and a single piece of piezoelectric material 21 shared by the two piezoelectric sensor elements as shown in FIG. 24. Furthermore, as shown in FIG. 25, a single piece of piezoelectric material 21 and a single lower electrode 23 may be shared by two piezoelectric elements.

A small-sized high-precision three-axis sensor having any of structures described above may be easily produced using a known technique such as a green sheet lamination technique or a screen printing technique.

In the present invention, a sensor unit is constructed by disposing at least three three-axis sensors of the type described above in one plane so that a physical quantity applied from the outside may be detected for each of X, Y, and Z directions independently of each other.

In the case where three sensors of the conventional type each having a sensitivity for a particular one direction are employed, it is required that the three sensors be disposed so that the respective sensors are oriented in directions to be detected. For example, three sensors are placed on three sides, respectively, of a cube. However, such a three-dimensional arrangement needs a large installation space.

In contrast, in the sensor unit according to the present invention, three-axis sensors are employed and they are disposed in one plane, and thus no problem occurs in terms of the installation space.

In the sensor unit according to the present invention, unlike the unit including only one three-axis sensor, there are three sensors and thus there are three operating points (such as weights) located at separate positions. Problems which may occur due to the separation of the three operating points or due to some difference among three operating members can be avoided by producing sensors so that they have a small enough size and have equal characteristics by means of the green sheet lamination technique or the screen printing technique.

The maximum allowable size of the sensor unit depends on an object on which the sensor is installed. In the case of head-mount displays, the maximum allowable size is about 20 mm square, and a 40 mm square is allowable for car applications. These sizes are within a practically achievable range.

Figure 26:
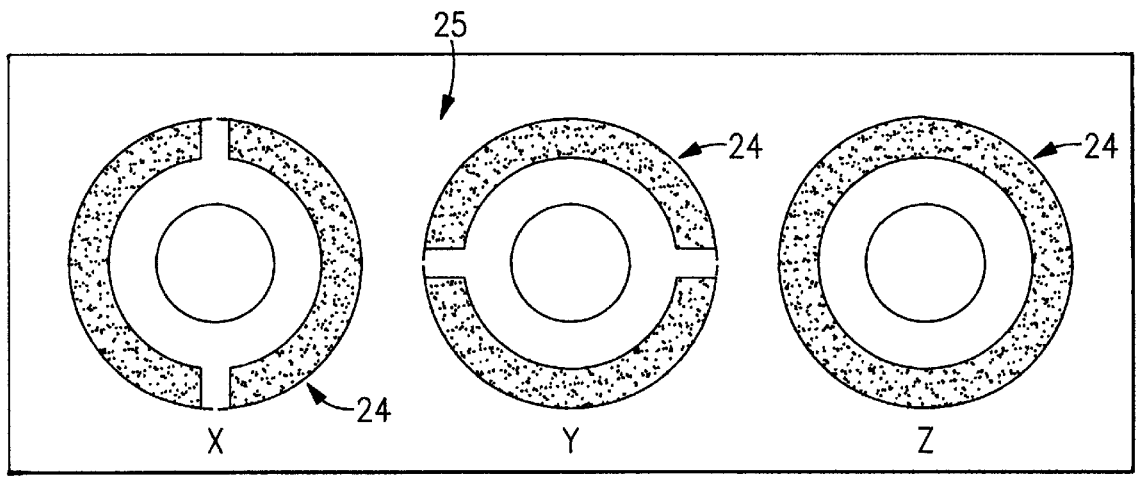
FIG. 26 is a top view of an embodiment of a sensor unit according to the present invention.
Figure 27:
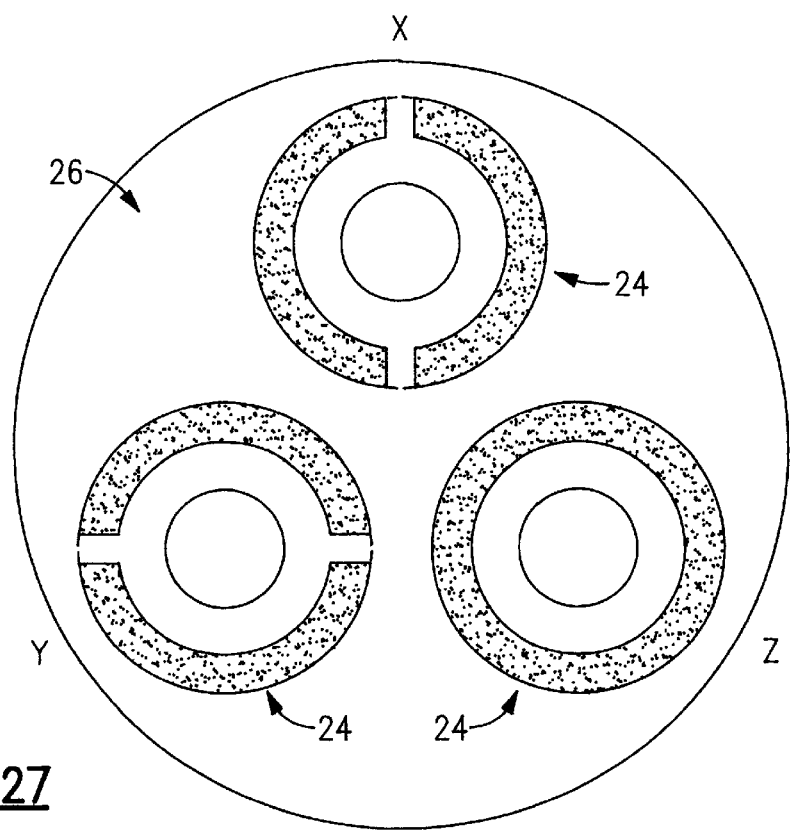
FIG. 27 is a top view of an embodiment of a sensor unit according to the present invention.
Figure 28:
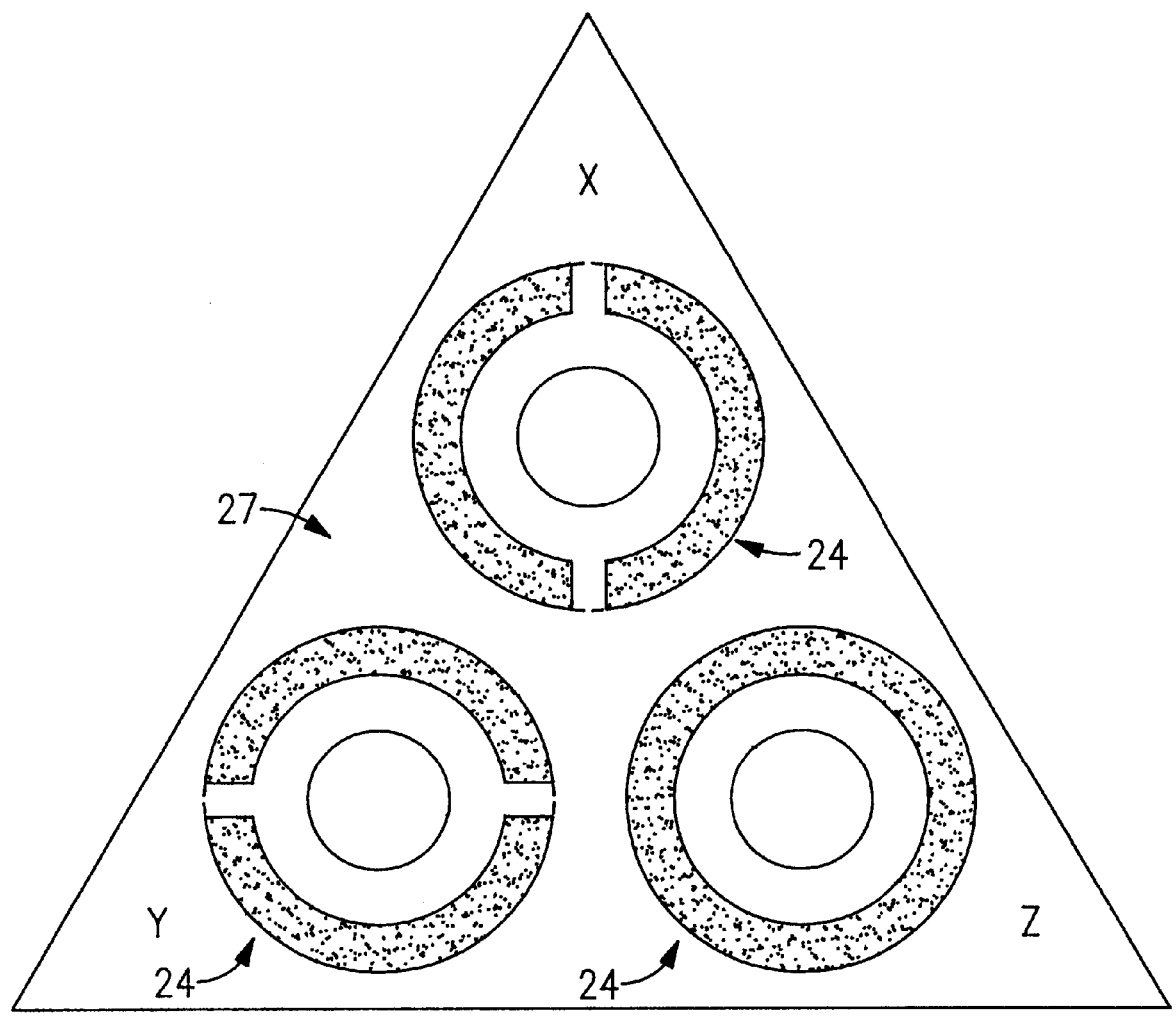
FIG. 28 is a top view of an embodiment of a sensor unit according to the present invention.

In the present invention, as described above, the sensor unit includes at least three sensors so that a physical quantity applied from the outside can be detected for each component of X, Y, and Z directions independently of each other. At least three sensors 24 may be located in various fashions. For example, they may be located in one line on a strip-shaped substrate 25 as shown in FIG. 26. Alternatively, they may be disposed at L-shaped locations. They may also be disposed on a circular-shaped substrate 26 or a triangular-shaped substrate 27 as shown in FIG. 27 or 28. The arrangements shown in FIGS. 27 and 28 have the advantage that a small total installation space is required.

Figure 29A:
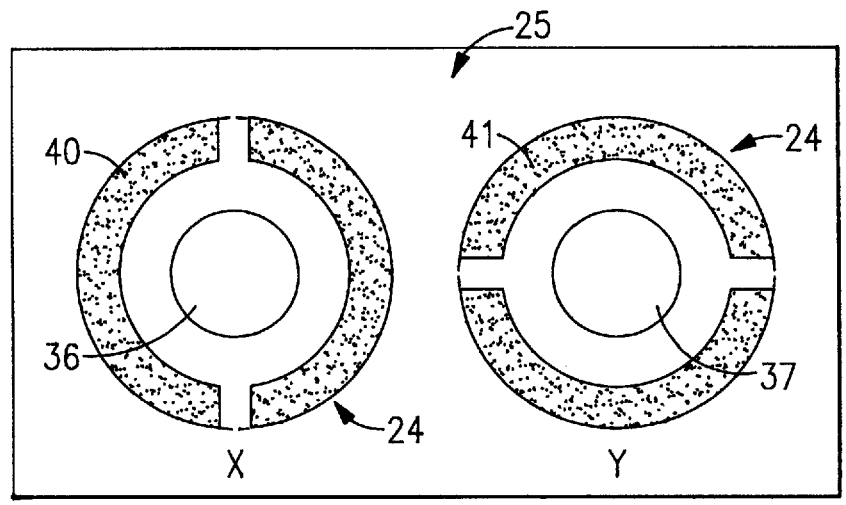
FIGS. 29(a)(b)(c) are schematic views of an embodiment of a sensor unit according to the present invention, wherein a top view is given in FIG. 29(a) and see-through views seen from the front side are given in FIGS. 29(b) and 29(c).
Figure 29B:
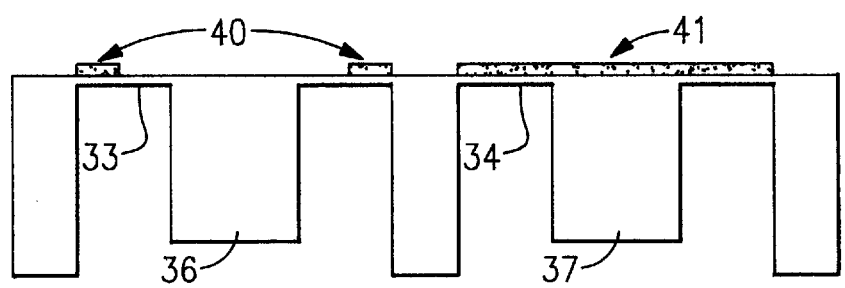
Figure 29C:
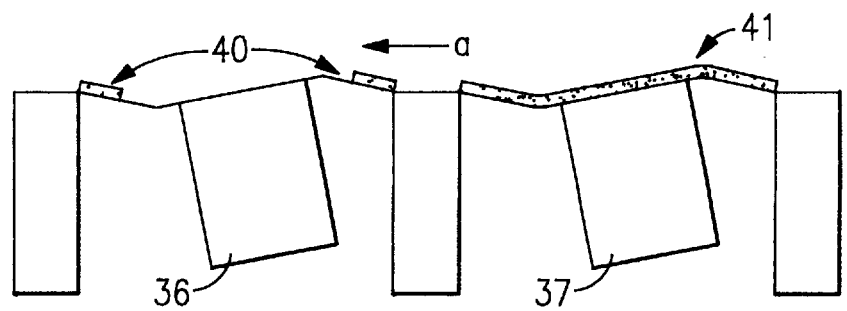

When it is required to detect an acceleration in the X-Y plane or in two directions as is the case in a sensor used with an air bag of a car, two sensors 24 located for example as shown in FIGS. 29(a)(b)(c) are enough for the purpose.

The basic way in which the piezoelectric material and the electrodes are disposed in the sensor unit according to the invention is described below.

Figure 30A:
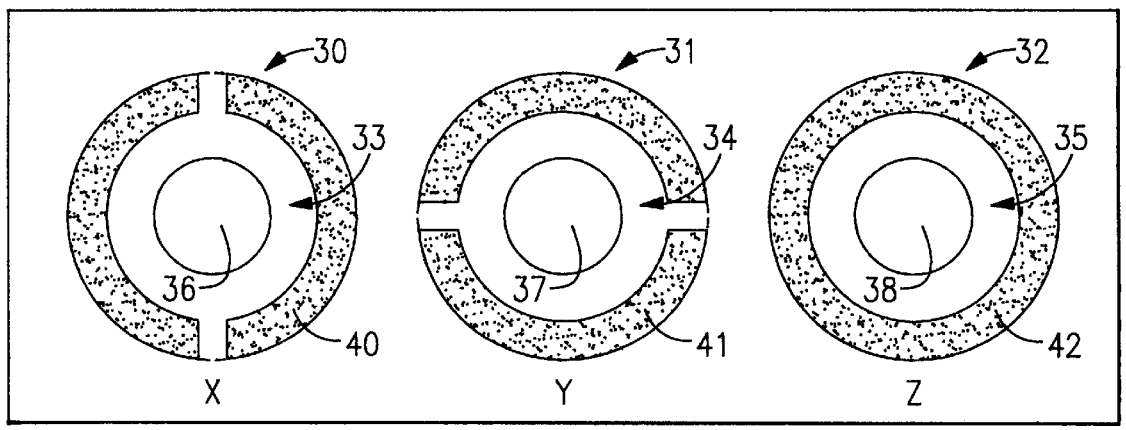
FIGS. 30(a)(b)(c) are top views of an embodiment of a sensor unit according to the present invention.
Figure 31A:
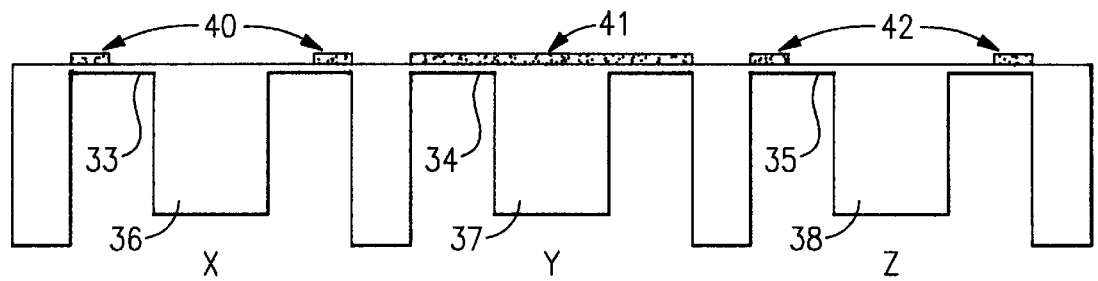
FIGS. 31(a)(b)(c) are see-through views, seen from the front side, of an embodiment of a sensor unit according to the present invention.

FIGS. 30(a)(b)(c) are top views of a sensor unit according to the present invention, and FIGS. 31(a)(b)(c) are see-through views thereof, seen from the front side.

In these figures, three-axis sensors 30, 31, and 32 are disposed from left to right wherein these sensors 30, 31, and 32 are responsible for detection in the X, Y, and Z directions, respectively. Piezoelectric materials 40, 41, and 42 are disposed on the respective circular-shaped flexible plates 33, 34, and 35 wherein the piezoelectric materials 40, 41, and 42 are located between the corresponding at least one pair of electrodes in such a manner that the upper and lower surfaces of the respective piezoelectric materials are in contact with the corresponding electrodes. Weights 36, 37, and 38 are suspended at the center of lower surface of the respective circular-shaped flexible plates 33, 34, and 35.

Figure 30B:
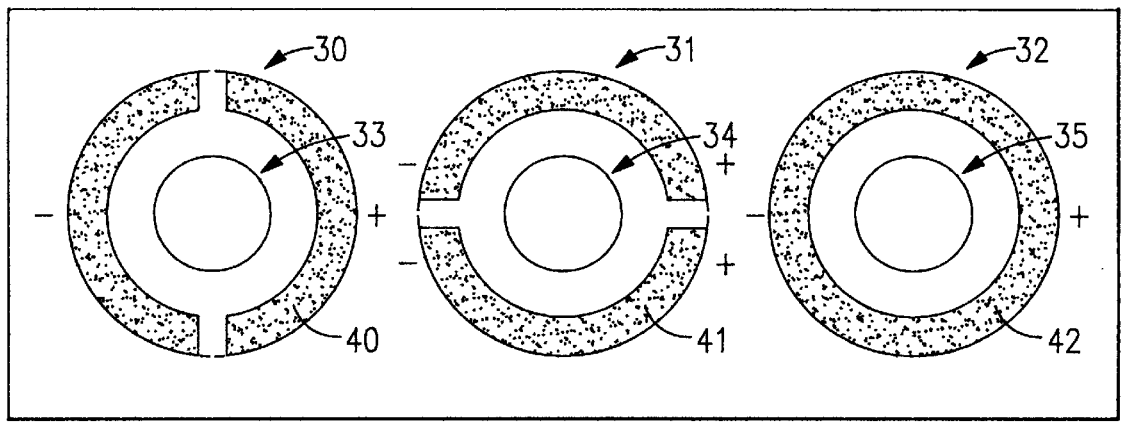
Figure 31B:
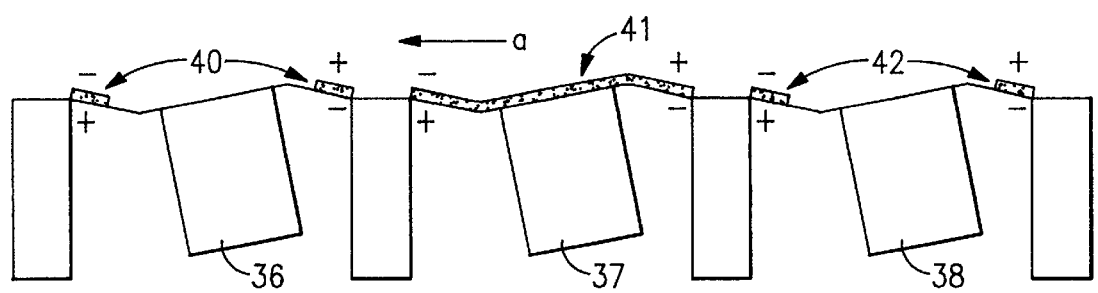
Figure 31B:
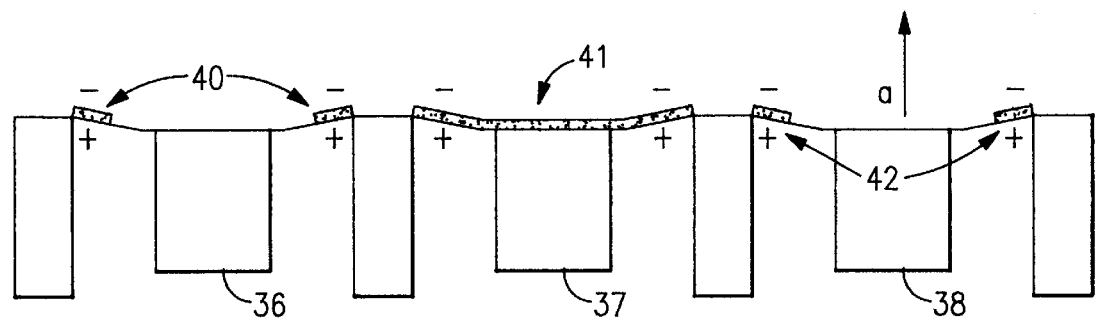

If an acceleration in the X direction is applied on this sensor unit, charges are generated, as shown in FIGS. 30b and 31b, in the piezoelectric materials 40, 41, and 42 located on the flexible plates 33, 34, and 35.

In this situation, charges equal in amount but opposite in polarity are generated on the upper surface (and also on the lower surface) of the single piece of piezoelectric material 42 of the Z-direction sensor 32. However, these charges in the piezoelectric material 42 are canceled out, and no voltage appears between the upper and lower electrodes. On the other hand, in the Y-direction sensor 31 having two pieces of piezoelectric materials 41 disposed in parallel to the X axis, charges equal in amount and opposite in polarity generated on the upper (lower) surface of each piece of piezoelectric material 41 are also canceled out, and no voltage appears between the upper and lower electrodes.

Thus, only the X-direction sensor 30 has a voltage appearing between upper and lower electrodes. In the case where an acceleration is applied in the Y direction, a voltage appears only in the Y-direction sensor 31.

Figure 30C:
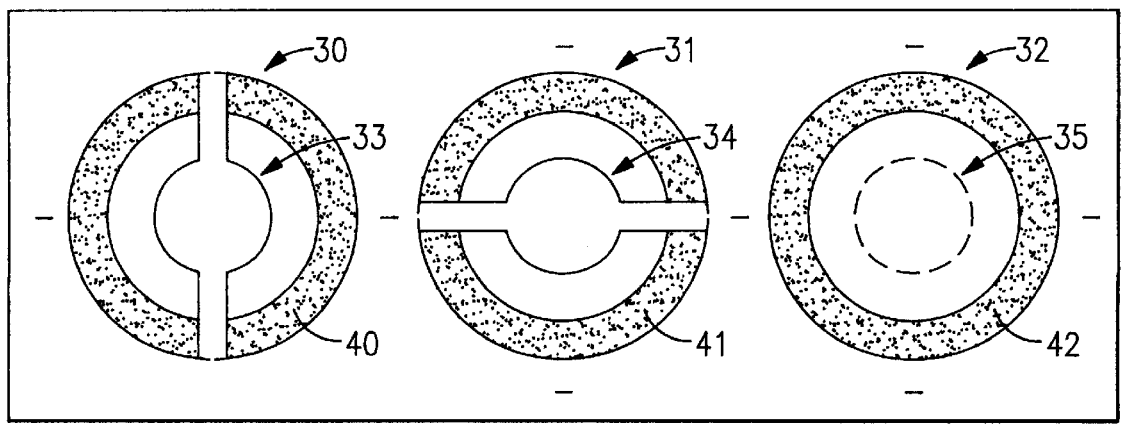

On the other hand, when an acceleration is applied in the Y direction, charges are generated in the piezoelectric materials 40, 41, and 42 on the flexible plates 33, 34, and 35 as shown in FIGS. 30(c) and 31(c).

In the X-direction sensor 30 having two pieces of piezoelectric materials 40, charges equal in amount and polarity appear on the upper (lower) surfaces of the two pieces of the piezoelectric materials 40, and thus a voltage appears between upper and lower electrodes. However, these charges result in a polarity pattern different from that which occurs when an acceleration is applied in the X direction, and therefore, if the electrodes are connected in a proper fashion, the charges which appear in response to the acceleration in the Z direction can be canceled out without causing cancellation for X-direction acceleration.

The electrodes of the Y-direction sensor 31 are also connected in a similar manner so that no output voltage appears in the Y-direction sensor 31 for the Z-direction acceleration. Thus, an output voltage appears only in the Z-direction sensor 32.

In this sensor unit, as described above, the respective sensors produce output voltages corresponding to the components in respective directions.

Figure 32A:
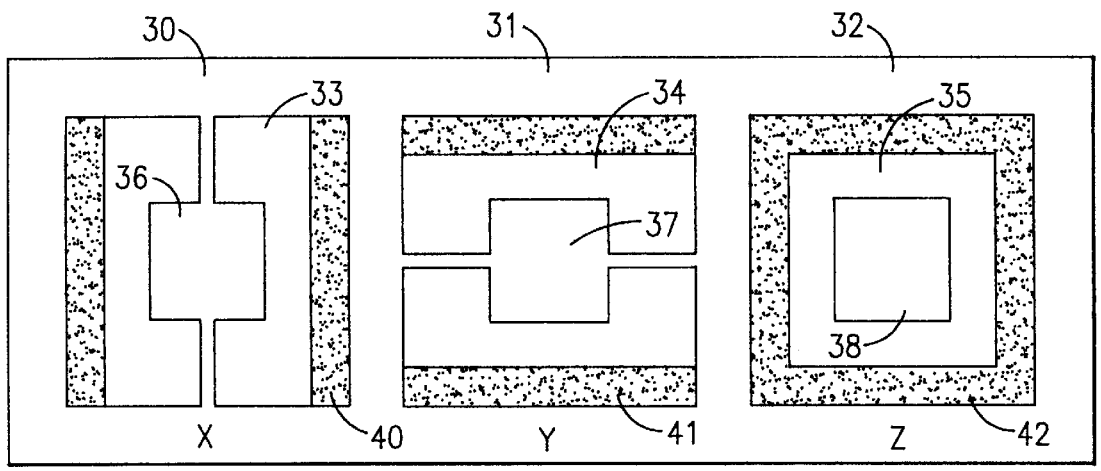
FIGS. 32(a)(b)(c) are schematic diagrams of an embodiment of a sensor unit according to the invention, wherein top views are given in FIGS. 32(a) and 32(b) and a see-through view seen from the front side is given in FIG. 32(c).

The shapes of the piezoelectric materials and electrodes are not limited to those described above. For example, instead of disposing piezoelectric materials on circular-shaped flexible plates as shown in FIGS. 30(a)(b)(c), they may also be disposed on rectangular-shaped flexible plates as shown in FIG. 32(a).

In the sensor unit according to the present invention, because each of the three sensors is responsible for detection only in one assigned direction, each sensor is needed to detect only one component of an acceleration in the assigned direction (for example the X-direction sensor is needed to detect a component in the X direction).

Therefore, it is desirable that the operating members of three-axis sensors be constrained so that they are allowed only in the motion along particular directions corresponding to the directions assigned to the respective three-axis sensors so that the respective sensors have anisotropic sensitivity to a physical quantity applied from the outside.

With this arrangement, the respective sensors do not respond to components different from the assigned direction. This makes it possible to prevent interference among components in the X, Y, and Z directions, and thus the external physical quantity can be detected more accurately.

More specifically, in the three-axis sensors assigned the X and Y directions, high-rigidity portions having a higher bending rigidity than the other portions may be formed on opposite sides of the flexible plate of each three-axis sensor so that the high-rigidity portions are at symmetric locations about the X or Y axis assigned to each three-axis sensor.

For example, in the X-direction sensor 30 located on the left side in FIG. 1(b) and in the Y-direction sensor 31 located at the center, the operating members (weights) 36 and 38 suspended below the flexible plates 33 and 34 have projections 44 and 45 so that operating members have a higher rigidity in the directions of the projections 44 and 45.

In this structure, although the weights 36 and 37 are constrained in the Z direction in which only bending stress is applied to the projections 44 and 45, the weights 36 and 37 have no constraint in motion in the direction in which no bending stress is applied to the projections 44 and 45, that is, in the X direction for the X-direction sensor 30 and in the Y direction for the Y-direction sensor 31.

In this structure, two sensors can accurately detect X and Y components, respectively, independently of each other.

In the case of the Z-direction sensor, it is preferable that the center of gravity of the operating member 39 is located within the plane of the flexible plate 35. More specifically, as is the case in the sensor 32 on the right side in FIG. 1(b), the operating member 38 is formed into a symmetric shape about the X-Y plane.

In this structure, the operating member 38 is balanced between the upper and lower portions with respect to the X-Y plane, and thus the operating member 38 does not move easily in the X and Y directions while it can easily move in the Z direction.

Therefore, the sensor 32 has no sensitivity to an acceleration in the X or Y direction and can detect only a Z component with high accuracy.

Another method of constraining the motion of the operating members 36 and 37 is to form thick portions having a greater thickness than the other portions on opposite sides of the flexible plates 33 and 34 of the respective three-axis sensors 30 and 31 so that the thick portions are at symmetric locations about the X or Y axis assigned to the respective three-axis sensors 30 and 31.

More specifically, the thick portions may be formed by means of a laminate molding technique into an integral fashion, by means of a screen printing technique, by means of bonding reinforcing members via an adhesive, or by means of the transfer printing technique. Of these techniques, the laminate molding into an integral fashion is more preferable because of its use.

Similar effects may also be achieved by forming hard portions having a greater hardness than the other portions on opposite sides of the flexible plates 33 and 34 of the respective three-axis sensors 30 and 31 so that the hard portions are at symmetric locations about the X or Y axis assigned to the respective three-axis sensors 30 and 31.

This can be accomplished for example by putting a hardening agent on the desired portions of the flexible plates 33 and 34 by means of coating or dispersion. As for the hardening agent, an agent which increases in the hardness as a result of chemical reaction or solid solution with the material of the flexible plate may be employed.

In the case where piezoelectric material 40 or 31 are disposed over the entire upper surface of the flexible plates 33 and 34, it is also possible to make either the flexible plates 33 and 34 themselves or the piezoelectric materials 40 and 41 partially hard thereby achieving similar effects.

SPECIFIC EXAMPLES

Some specific examples of sensor units according to the present invention are described below.

Example 1

Figure 1A:
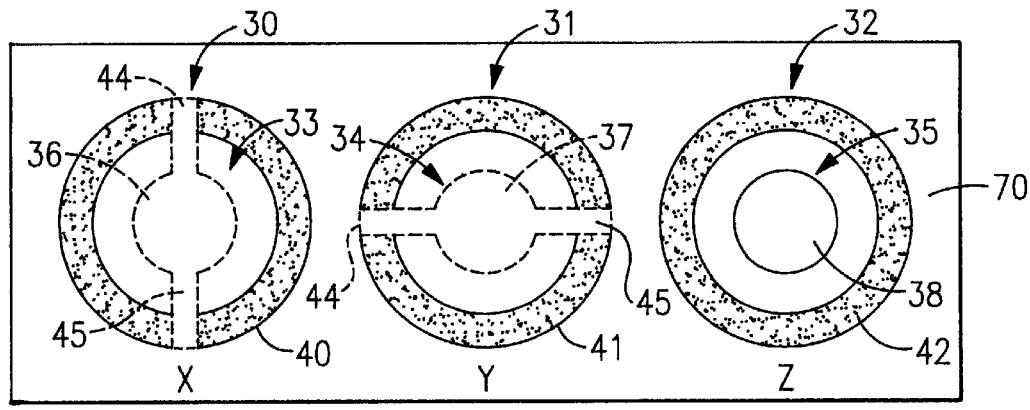
FIGS. 1(a)(b)(c)(d) are schematic diagrams of an embodiment of a sensor unit according to the present invention, wherein a top view is given in FIG. 1(a) and see-through views seen from the front side are given in FIGS. 1(b), 1(c), and 1(d).
Figure 1B:
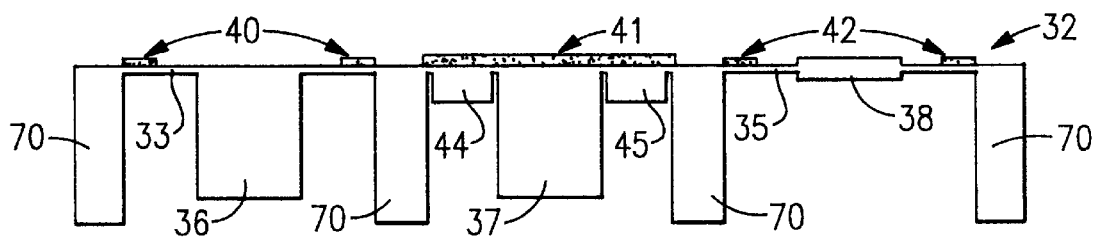
Figure 1C:
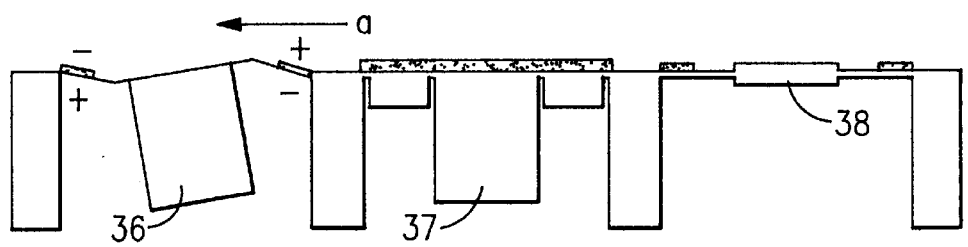
Figure 1D:
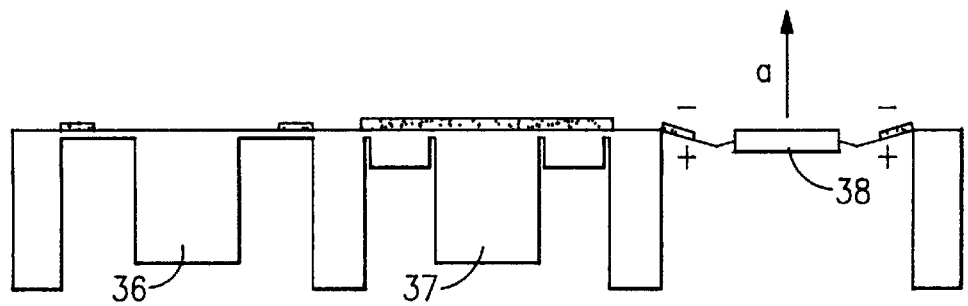
Figure 2:
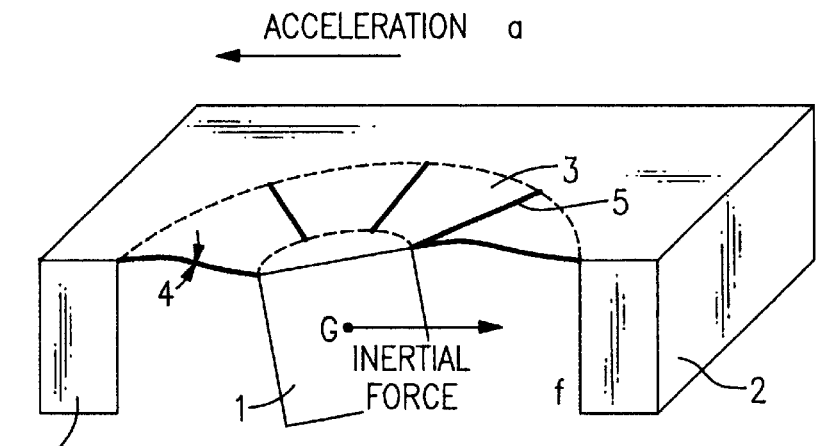
FIG. 2 is a perspective view of an embodiment of a three-axis sensor used in the present invention.
Figure 4A:
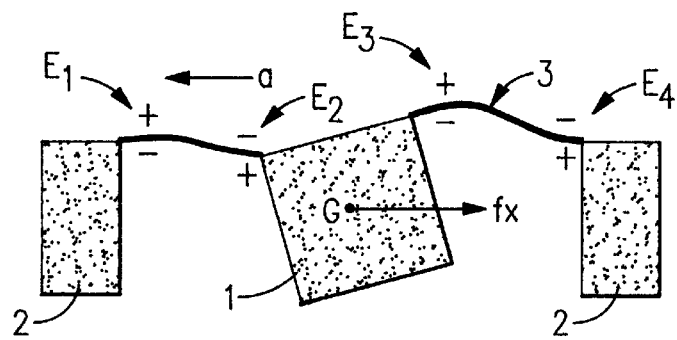
FIGS. 4(a)(b) are schematic diagrams conceptually illustrating the operation of a three-axis sensor used in the invention.
Figure 4B:
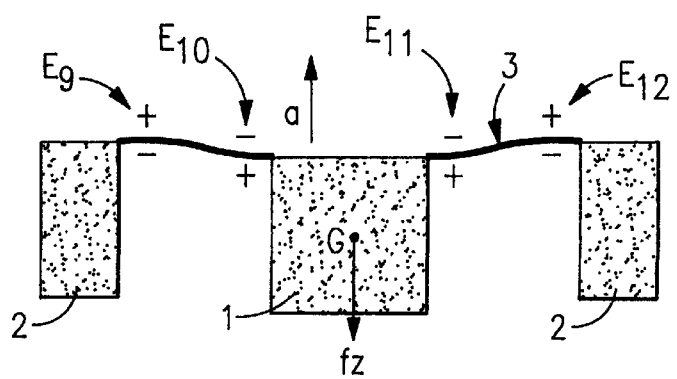

FIGS. 1(a)(b)(c) illustrate an example in which piezoelectric materials 40, 41, and 42 are disposed together with corresponding electrodes on circular-shaped flexible plates 33, 34, and 35, respectively, wherein weights 36, and 38 are suspended at the center of the respective flexible plates 33, 34, and 35.

Flat plate-shaped projections 44 and 45 having a high bending rigidity are formed on the respective weights 36 and 37 suspended by the respective flexible plate 33 and 34. In the case of the X-direction sensor 30 on the left side of FIGS. 1(a)–(d), projections 44 and 45 are formed on opposite sides of the weight 36 and located at symmetric positions about the X axis. In the Y-direction sensor 31 located at the center in FIGS. 1(a)–(d), two projections 44 and 45 are formed on opposite sides of the weight 37 and located at symmetric positions about the Y axis.

In the Y-direction sensor 31, the weight 37 is constrained in motion in the X and Y directions in which a bending stress occurs on the projections 44 and 45 while motion is not restricted in the Y direction in which no bending stress occurs on the projections 44 and 45. In the X-direction sensor 30, similar constraints of motion occur.

In the case of the Z-direction sensor 32 on the right side of FIGS. 1(a)–(d), the operating member 38 is formed into a symmetric shape about the X-Y plane and located so that the center of gravity of the operating member 38 is in the plane of the flexible plate 35.

In this structure, the operating member 38 is balanced between the upper and lower portions with respect to the X-Y plane, and thus the operating member 38 does not move easily in the X and Y directions while it can easily move in the Z direction.

In the sensor unit shown in FIGS. 1(a)–(d), as described above, each sensor responds only to the component assigned to it, and thus the respective components in the X, Y, and Z directions are detected accurately.

Example 2

Figure 32B:
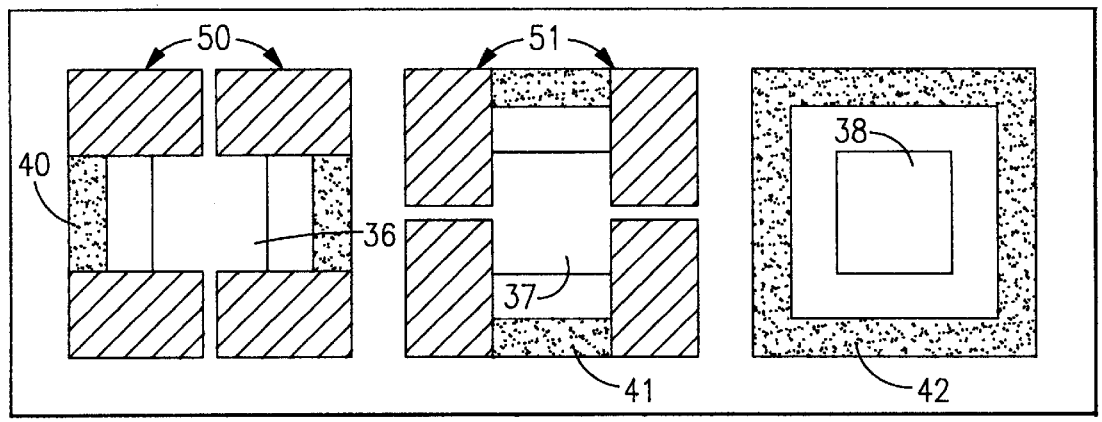
Figure 32C:
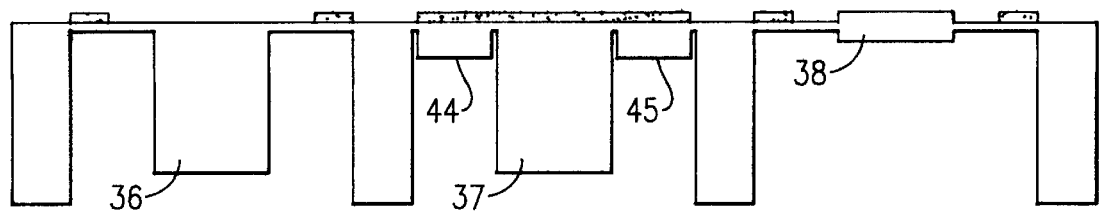

In another example shown in FIG. 32(b), the basic structure shown in FIG. 32(a), in which piezoelectric materials 40, 41, and 42 are disposed together with corresponding electrodes on rectangular-shaped flexible plates 33, 34, and 35, is modified such that the flexible plates 33 and 34 of the respective sensors 30 and 31 have holes 50 and 51, respectively.

As a result of the formation of the holes 50 and 51, the flexible plates 33 and 34 become easier to deform, thus achieving a higher sensitivity.

Example 3

Figure 33A:
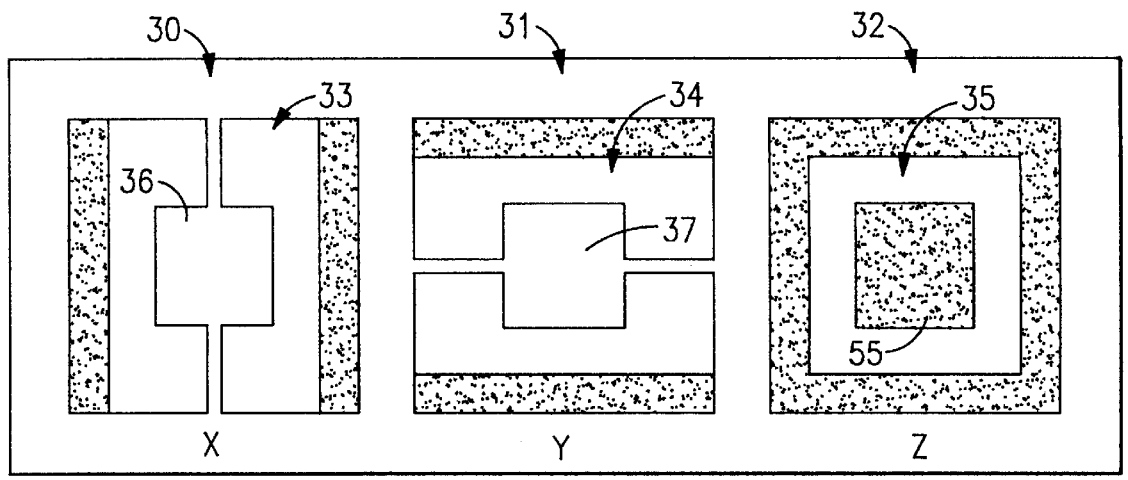
FIGS. 33(a)(b) are schematic diagrams of an embodiment of a sensor unit according to the present invention, wherein a top view is given in FIG. 33(a) and a see-through view seen from the front side is given in FIG. 33(b).
Figure 33B:
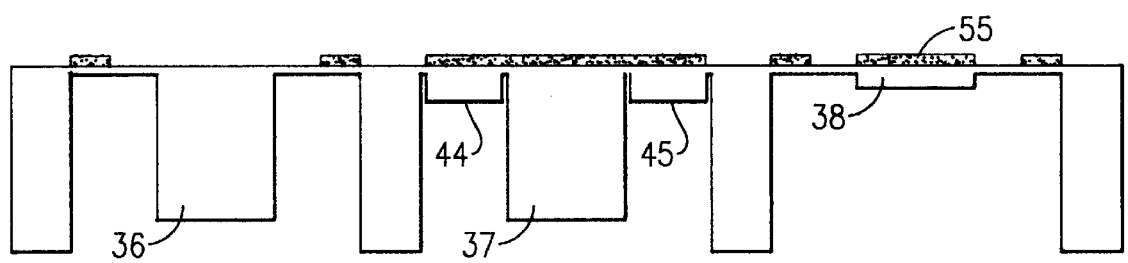

FIGS. 33(a)(b) illustrate another example in which the basic structure shown in FIG. 32(a) is employed but the weight of the Z-direction sensor 32 is modified so that the upper portion of the weight located on the upper side of the flexible plate 35 is made of a piezoelectric material 55.

This structure can be easily realized by producing the weight and the piezoelectric material 55 by means of simple steps of printing process.

Example 4

FIGS. 34(a)(b) illustrate an example in which the basic structure shown in FIG. 32(b) is employed but the structure of each three-axis sensor is converted into an umbrella-shaped structure. The umbrella-shaped structure refers, as described earlier, to a basic sensor structure comprising a supporting column 65, 66, or 67 and a flexible plate 33, 34, or 35 having a piezoelectric material 40, 41, or 42 in contact with at least one pair of electrodes and horizontally extending from the central position where the supporting column is located.

In this umbrella-shaped structure, weights 56, 57, and 58 having a large mass can be easily realized, and thus it is possible to easily enhance the sensitivity of the sensors.

Figure 35A:
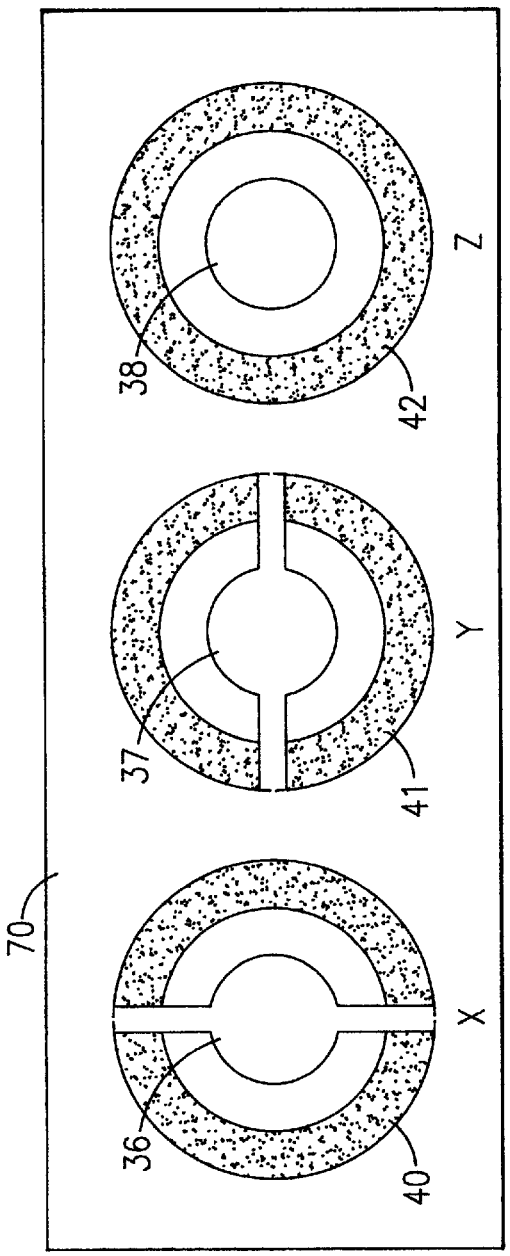
FIGS. 35(a)(b) are schematic diagrams of an embodiment of a sensor unit according to the present invention, wherein a top view is given in FIG. 35(a) and a see-through view seen from the front side is given in FIG. 35(b).
Figure 35B:
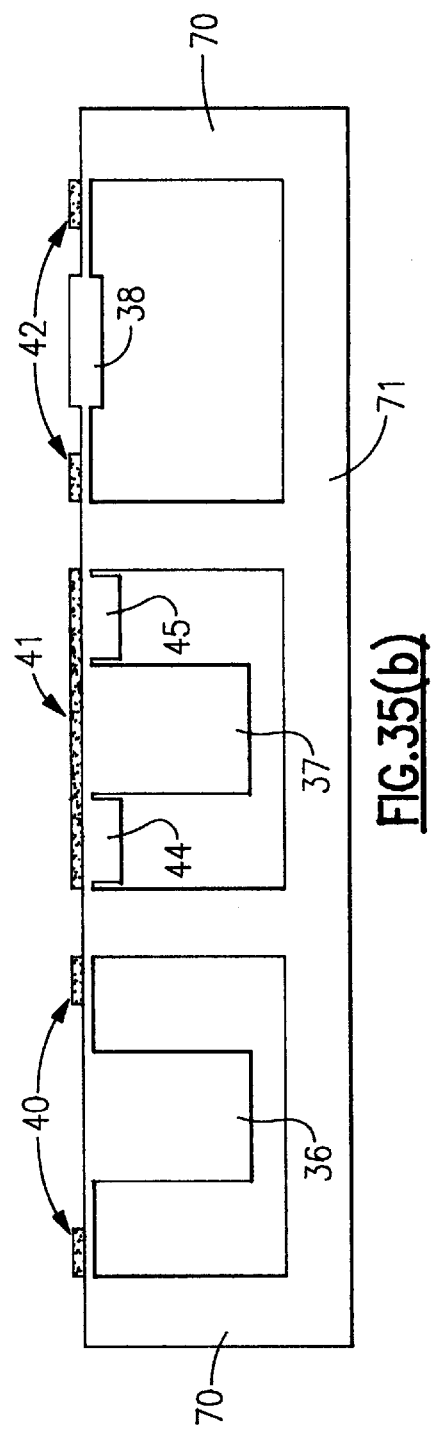

FIGS. 35(a)(b) illustrate an example in which the basic structure employed in Example 1 is modified such that the supporting base 70 has a bottom plate 71.

The formation of the bottom plate 71 of the supporting base 70 results in an increase in the rigidity of the supporting base 70, thus ensuring high-accuracy detection of the behavior of an object (such as a car) on which the sensor unit is installed. Furthermore, this structure makes it easy to install the sensor unit on the object.

In the sensor unit according to the present invention, as described above, each sensor responds only to a particular component assigned to the sensor without encountering interference among components in the X, Y, and Z directions, thus ensuring that each component can be detected independently of each other. This allows an improvement in detection accuracy while maintaining a high sensitivity.

What is claimed is:

1. A sensor unit comprising at least three three-axis sensors disposed in one plane, said at least three three-axis sensors each comprising:

an operating member;

a supporting base having a hollow and disposed around said operating member located at the center of the hollow; and a flexible plate having a piece of piezoelectric material in contact with at least one pair of electrodes and extending across said hollow at an end of said supporting base, said operating member being suspended at the center of said hollow by said flexible plate;

said flexible plate being deformed in response to the behavior of said operating member corresponding to a physical quantity applied from the outside, said piece of piezoelectric material generating a charge corresponding to the deformation of the flexible plate thereby three-dimensionally detecting the magnitude and the direction of said physical quantity, wherein:

when a three-dimensional X-Y-Z coordinate system is defined in such a manner that the central point of said flexible plate at which said operating member is suspended is defined as an origin O and a plane parallel to said flexible plate and passing through said origin O is defined as an X-Y plane, said three three-axis sensors are assigned the X, Y, and Z directions, respectively, of said three-dimensional coordinate system so that a physical quantity applied from the outside is detected for each component in the X, Y, and Z directions independently of each other thereby three-dimensionally detecting the magnitude and the direction of said physical quantity.

2. A sensor unit according to claim 1, wherein a weight is employed as the operating member for detecting an acceleration applied from the outside.

3. A sensor unit according to claim 1, wherein in the three-axis sensors assigned the X, Y, and Z directions, respectively, each operating member is constrained in motion so that said each operating member can move only in a specified direction thereby making each three-axis sensor have an anisotropic sensitivity to the physical quantity applied from the outside.

4. A sensor unit according to claim 3, wherein in each of the three-axis sensors assigned the X and Y directions, respectively, high-rigidity portions having a higher bending rigidity than the other portions of the flexible plate are formed on opposite sides of the flexible plate of said each three-axis sensor so that said high-rigidity portions are at symmetric locations about the X or Y axis assigned to said each three-axis sensor thereby constraining the motion of said each operating member.

5. A sensor unit according to claim 3, wherein in each of the three-axis sensors assigned the X and Y directions, respectively, thick portions having a greater thickness than the other portions of the flexible plate are formed on opposite sides of the flexible plate of said each three-axis sensor so that said thick portions are at symmetric locations about the X or Y axis assigned to said each three-axis sensor thereby constraining the motion of said each operating member.

6. A sensor unit according to claim 5, wherein said thick portions having a greater thickness than the other portions of the flexible plate are formed on the flexible plate by means of laminate molding into an integral form.

7. A sensor unit according to claim 5, wherein said thick portions having a greater thickness than the other portions are formed on the flexible plate by means of a screen printing technique, by means of putting a reinforcing member via an adhesive, or by means of a transfer printing technique.

8. A sensor unit according to claim 3, wherein in each of the three-axis sensors assigned the X and Y directions, respectively, hard portions having a greater hardness than the other portions of the flexible plate are formed on opposite sides of the flexible plate of said each three-axis sensor so that said hard portions are at symmetric locations about the X or Y axis assigned to said each three-axis sensor thereby constraining the motion of said each operating member.

9. A sensor unit according to claim 8, wherein said hard portions having a greater hardness than the other portions of the flexible plate are formed on the flexible plate itself or on the piezoelectric member formed over an entire upper surface of said flexible plate by disposing a hardening agent by means of coating or spraying technique.

10. A sensor unit according to claim 3, wherein in the three-axis sensor assigned the Z direction, said operating member suspended by the flexible plate of said three-axis sensor is formed so that a center of gravity of said operating member is located in the plane of said flexible plate thereby constraining the motion of said operating member.

11. A sensor unit according to claim 10, wherein said operating member is formed so that it has a symmetric shape about the X-Y plane thereby locating the center of gravity of said operating member in the plane of said flexible plate.

12. The sensor unit according to claim 1, wherein each sensor includes means for substantially constraining movement of the operating member to only a single direction.

13. A sensor unit comprising two three-axis sensors disposed in one plane, said two three-axis sensors each comprising:

an operating member;

a supporting base having a hollow and disposed around said operating member located at the center of the hollow; and a flexible plate having a piece of piezoelectric material in contact with at least one pair of electrodes and extending across said hollow at an end of said supporting base, said operating member being suspended at the center of said hollow by said flexible plate;

said flexible plate being deformed in response to the behavior of said operating member corresponding to a physical quantity applied from the outside, said piece of piezoelectric material generating a charge corresponding to the deformation of the flexible plate thereby three-dimensionally detecting the magnitude and the direction of said physical quantity, wherein:

when a two-dimensional X-Y coordinate system is defined in such a manner that the central point of said flexible plate at which said operating member is suspended is defined as an origin O and a plane parallel to said flexible plate and passing through said origin O is defined as an X-Y plane, said two three-axis sensors are assigned the X and Y directions, respectively, of said two-dimensional coordinate system so that a physical quantity applied from the outside is detected for each component in the X and Y directions independently of each other thereby two-dimensionally detecting the magnitude and the direction of said physical quantity.

14. A sensor unit according to claim 13, wherein a weight is employed the operating member for detecting an acceleration applied from the outside.

15. A sensor unit according to claim 13, wherein in each of the three-axis sensors assigned the X and Y directions, respectively, each operating member is constrained in motion so that said each operating member can move only in a specified direction thereby making each three-axis sensor have an anisotropic sensitivity to the physical quantity applied from the outside.

16. A sensor unit according to claim 15, wherein in each of the three-axis sensors assigned the X and Y directions, respectively, high-rigidity portions having a higher bending rigidity than the other portions of the flexible plate are formed on opposite sides of the flexible plate of said each three-axis sensor so that said high-rigidity portions are at symmetric locations about the X or Y axis assigned to said each three-axis sensor thereby constraining the motion of said each operating member.

* * * * *